United States Patent
Chandran

(10) Patent No.: US 11,887,175 B2
(45) Date of Patent: Jan. 30, 2024

(54) AUTOMATICALLY DETERMINING A PERSONALIZED SET OF PROGRAMS OR PRODUCTS INCLUDING AN INTERACTIVE GRAPHICAL USER INTERFACE

(71) Applicant: CPL ASSETS, LLC, Playa Vista, CA (US)

(72) Inventor: Rohan K. K. Chandran, Sunnyvale, CA (US)

(73) Assignee: CPL ASSETS, LLC, Playa Vista, CA (US)

(*) Notice: Subject to any disclaimer, the term of this patent is extended or adjusted under 35 U.S.C. 154(b) by 0 days.

(21) Appl. No.: 17/812,859

(22) Filed: Jul. 15, 2022

(65) Prior Publication Data
US 2023/0005043 A1    Jan. 5, 2023

Related U.S. Application Data

(63) Continuation of application No. 14/975,219, filed on Dec. 18, 2015, now abandoned, which is a
(Continued)

(51) Int. Cl.
*G06Q 40/00*    (2023.01)
*G06Q 30/0601*    (2023.01)
*G06Q 40/03*    (2023.01)

(52) U.S. Cl.
CPC ..... *G06Q 30/0631* (2013.01); *G06Q 30/0643* (2013.01); *G06Q 40/03* (2023.01)

(58) Field of Classification Search
CPC ...... G06Q 40/02; G06Q 40/025; G06Q 30/06; G06Q 30/0631; G06Q 30/0643; G06Q 40/03
(Continued)

(56) References Cited

U.S. PATENT DOCUMENTS 3,316,395 A    4/1967   Lavin
3,316,396 A    4/1967   Lavin
(Continued)

FOREIGN PATENT DOCUMENTS

CN    1290372    5/2001
EP    0 749 081    12/1966
(Continued)

OTHER PUBLICATIONS

"ACS Company Birch & Davis Wins Texas CHIP Contract," PR Newswire, Section: Financial News, 3 pgs., Dallas, TX, May 17, 2000.
(Continued)

*Primary Examiner* — Jessica Lemieux
*Assistant Examiner* — Mohammed H Mustafa
(74) *Attorney, Agent, or Firm* — Knobbe Martens Olson & Bear, LLP

(57) ABSTRACT

Prescreened electronic programs or products that are automatically determined for a specific potential entity based on characteristics and/or geographic location, then can be automatically ranked based on calculated expected values of respective programs or products. The ranked programs or products are digitally/electronically presented in an interactive graphical user interface to the specific entity for digital selection and application.

4 Claims, 8 Drawing Sheets

Related U.S. Application Data continuation of application No. 14/451,137, filed on Aug. 4, 2014, now abandoned, which is a continuation of application No. 11/848,138, filed on Aug. 30, 2007, now Pat. No. 8,799,148.

(60) Provisional application No. 60/824,252, filed on Aug. 31, 2006.

(58) Field of Classification Search
USPC .................................................. 705/4, 35–45
See application file for complete search history.

(56) References Cited

U.S. PATENT DOCUMENTS

| | | |
|---|---|---|
| 4,305,059 A | 12/1981 | Benton |
| 4,491,725 A | 1/1985 | Pritchard |
| 4,578,530 A | 3/1986 | Zeidler |
| 4,736,294 A | 4/1988 | Gill |
| 4,774,664 A | 9/1988 | Campbell et al. |
| 4,775,935 A | 10/1988 | Yourick |
| 4,812,628 A | 3/1989 | Boston et al. |
| 4,872,113 A | 10/1989 | Dinerstein |
| 4,876,592 A | 10/1989 | Von Kohorn |
| 4,895,518 A | 1/1990 | Arnold |
| 4,947,028 A | 8/1990 | Gorog |
| 4,982,346 A | 1/1991 | Girouard et al. |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,201,010 A | 4/1993 | Deaton et al. |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,283,731 A | 2/1994 | Lalonde et al. |
| 5,301,105 A | 4/1994 | Cummings, Jr. |
| 5,305,195 A | 4/1994 | Murphy |
| 5,336,870 A | 8/1994 | Hughes et al. |
| 5,459,306 A | 10/1995 | Stein et al. |
| 5,515,098 A | 5/1996 | Carles |
| 5,557,514 A | 9/1996 | Seare et al. |
| 5,583,760 A | 12/1996 | Klesse |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,630,127 A | 5/1997 | Moore et al. |
| 5,640,577 A | 6/1997 | Scharmer |
| 5,644,778 A | 7/1997 | Burks et al. |
| 5,661,516 A | 8/1997 | Carles |
| 5,696,907 A | 12/1997 | Tom |
| 5,699,527 A | 12/1997 | Davidson |
| 5,704,029 A | 12/1997 | Wright, Jr. |
| 5,704,044 A | 12/1997 | Tarter et al. |
| 5,724,521 A | 3/1998 | Dedrick |
| 5,732,400 A | 3/1998 | Mandler |
| 5,740,549 A | 4/1998 | Reilly et al. |
| 5,764,923 A | 6/1998 | Tallman et al. |
| 5,774,883 A | 6/1998 | Andersen |
| 5,793,972 A | 8/1998 | Shane |
| 5,819,234 A | 10/1998 | Slavin et al. |
| 5,822,410 A | 10/1998 | McCausland et al. |
| 5,832,447 A | 11/1998 | Rieker et al. |
| 5,844,218 A | 12/1998 | Kawan et al. |
| 5,848,396 A | 12/1998 | Gerace |
| 5,857,175 A | 1/1999 | Day et al. |
| 5,870,721 A | 2/1999 | Norris |
| 5,873,068 A | 2/1999 | Beaumont et al. |
| 5,875,236 A | 2/1999 | Jankowitz |
| 5,878,403 A | 3/1999 | DeFrancesco et al. |
| 5,884,287 A | 3/1999 | Edesess |
| 5,907,828 A | 5/1999 | Meyer et al. |
| 5,924,082 A | 7/1999 | Silverman et al. |
| 5,926,800 A | 7/1999 | Baronowski et al. |
| 5,930,759 A | 7/1999 | Moore et al. |
| 5,930,764 A | 7/1999 | Melchione et al. |
| 5,930,776 A | 7/1999 | Dykstra et al. |
| 5,933,809 A | 8/1999 | Hunt et al. |
| 5,940,812 A | 8/1999 | Tangel et al. |
| 5,944,790 A | 8/1999 | Levy |
| 5,950,172 A | 9/1999 | Klingman |
| 5,956,693 A | 9/1999 | Geerlings |
| 5,966,695 A | 10/1999 | Melchione |
| 5,966,699 A | 10/1999 | Zandi |
| 5,970,478 A | 10/1999 | Walker et al. |
| 5,978,785 A | 11/1999 | Johnson et al. |
| 5,990,038 A | 11/1999 | Suga et al. |
| 5,991,735 A | 11/1999 | Gerace |
| 5,995,947 A | 11/1999 | Fraser et al. |
| 6,014,632 A | 1/2000 | Gamble et al. |
| 6,018,723 A | 1/2000 | Siegel et al. |
| 6,029,149 A | 2/2000 | Dykstra et al. |
| 6,038,551 A | 3/2000 | Barlow et al. |
| 6,044,351 A | 3/2000 | Jones |
| 6,044,352 A | 3/2000 | Deavers |
| 6,064,987 A | 5/2000 | Walker |
| 6,067,522 A | 5/2000 | Warady et al. |
| 6,070,141 A | 5/2000 | Houvener |
| 6,070,147 A | 5/2000 | Harms et al. |
| 6,073,104 A | 6/2000 | Field |
| 6,088,686 A | 7/2000 | Walker et al. |
| 6,094,643 A | 7/2000 | Anderson et al. |
| 6,098,052 A | 8/2000 | Kosiba et al. |
| 6,101,486 A | 8/2000 | Roberts et al. |
| 6,105,007 A | 8/2000 | Norris |
| 6,108,641 A | 8/2000 | Kenna et al. |
| 6,115,690 A | 9/2000 | Wong |
| 6,119,103 A | 9/2000 | Basch et al. |
| 6,128,599 A | 10/2000 | Walker |
| 6,128,603 A | 10/2000 | Dent |
| 6,129,273 A | 10/2000 | Shah |
| 6,144,948 A | 11/2000 | Walker et al. |
| 6,158,657 A | 12/2000 | Hall et al. |
| 6,163,770 A | 12/2000 | Gamble et al. |
| 6,171,112 B1 | 1/2001 | Clark et al. |
| 6,185,543 B1 | 2/2001 | Galperin et al. |
| 6,208,973 B1 | 3/2001 | Boyer et al. |
| 6,208,979 B1 | 3/2001 | Sinclair |
| 6,236,977 B1 | 5/2001 | Verba et al. |
| 6,249,770 B1 | 6/2001 | Erwin et al. |
| 6,289,318 B1 | 9/2001 | Barber |
| 6,298,330 B1 | 10/2001 | Gardenswartz et al. |
| 6,311,169 B2 | 10/2001 | Duhon |
| 6,317,752 B1 | 11/2001 | Lee et al. |
| 6,324,524 B1 | 11/2001 | Lent et al. |
| 6,324,566 B1 | 11/2001 | Himmel et al. |
| 6,330,575 B1 | 12/2001 | Moore |
| 6,334,110 B1 | 12/2001 | Walter et al. |
| 6,374,229 B1 | 4/2002 | Lowrey et al. |
| 6,374,230 B1 | 4/2002 | Walker et al. |
| 6,385,592 B1 | 5/2002 | Angles et al. |
| 6,385,594 B1 | 5/2002 | Lebda et al. |
| 6,405,173 B1 | 6/2002 | Honarvar |
| 6,405,181 B2 | 6/2002 | Lent et al. |
| 6,442,577 B1 | 8/2002 | Britton et al. |
| 6,453,297 B1 | 9/2002 | Burks et al. |
| 6,456,983 B1 | 9/2002 | Keyes et al. |
| 6,460,036 B1 | 10/2002 | Herz |
| 6,513,018 B1 | 1/2003 | Culhane |
| 6,567,791 B2 | 5/2003 | Lent et al. |
| 6,587,841 B1 | 7/2003 | DeFrancesco |
| 6,598,030 B1 | 7/2003 | Siegel et al. |
| 6,611,816 B2 | 8/2003 | Lebda et al. |
| 6,615,247 B1 | 9/2003 | Murphy |
| 6,623,529 B1 | 9/2003 | Lakritz |
| 6,640,215 B1 | 10/2003 | Galperin et al. |
| 6,658,393 B1 | 12/2003 | Basch et al. |
| 6,665,715 B1 | 12/2003 | Houri |
| 6,684,093 B2 | 1/2004 | Kuth |
| 6,757,740 B1 | 6/2004 | Parekh et al. |
| 6,804,346 B1 | 10/2004 | Mewhinney |

(56) References Cited

U.S. PATENT DOCUMENTS

| | | |
|---|---|---|
| 6,810,356 B1 | 10/2004 | Garcia-Franco et al. |
| 6,826,535 B2 | 11/2004 | Wood et al. |
| 6,847,942 B1 | 1/2005 | Land et al. |
| 6,901,406 B2 | 5/2005 | Nabe et al. |
| 6,910,624 B1 | 6/2005 | Natsuno |
| 6,925,441 B1 | 8/2005 | Jones, III et al. |
| 6,934,714 B2 | 8/2005 | Meinig |
| 6,959,281 B1 | 10/2005 | Freeling et al. |
| 6,980,969 B1 | 12/2005 | Tuchler et al. |
| 6,983,478 B1 | 1/2006 | Grauch et al. |
| 6,985,887 B1 | 1/2006 | Sunstein et al. |
| 7,003,491 B2 | 2/2006 | Starkman |
| 7,003,792 B1 | 2/2006 | Yuen |
| 7,028,052 B2 | 4/2006 | Chapman et al. |
| 7,033,792 B2 | 4/2006 | Zhong et al. |
| 7,072,842 B2 | 7/2006 | Provost et al. |
| 7,072,853 B2 | 7/2006 | Shkedi |
| 7,072,909 B2 | 7/2006 | Polk |
| 7,072,963 B2 | 7/2006 | Anderson et al. |
| 7,076,462 B1 | 7/2006 | Nelson et al. |
| 7,133,840 B1 | 11/2006 | Kenna et al. |
| 7,143,063 B2 | 11/2006 | Lent |
| 7,150,030 B1 | 12/2006 | Eldering et al. |
| 7,152,018 B2 | 12/2006 | Wicks |
| 7,152,237 B2 | 12/2006 | Flickinger et al. |
| 7,171,371 B2 | 1/2007 | Goldstein |
| 7,174,302 B2 | 2/2007 | Patricelli et al. |
| 7,178,720 B1 | 2/2007 | Strubbe et al. |
| 7,181,427 B1 | 2/2007 | DeFrancesco |
| 7,185,353 B2 | 2/2007 | Schlack |
| 7,191,150 B1 | 3/2007 | Shao et al. |
| 7,191,451 B2 | 3/2007 | Nakagawa |
| 7,197,468 B1 | 3/2007 | Patricelli et al. |
| 7,246,068 B2 | 7/2007 | Thomas, Jr. |
| 7,249,076 B1 | 7/2007 | Pendleton et al. |
| 7,275,083 B1 | 9/2007 | Seibel et al. |
| 7,281,652 B2 | 10/2007 | Foss |
| 7,295,988 B1 | 11/2007 | Reeves |
| 7,298,872 B2 | 11/2007 | Glisson |
| 7,305,359 B2 | 12/2007 | Bonnell |
| 7,310,617 B1 | 12/2007 | Cunningham |
| 7,328,276 B2 | 2/2008 | Alisuag |
| 7,330,835 B2 | 2/2008 | Deggendorf |
| 7,333,937 B2 | 2/2008 | Baldwin, Jr. et al. |
| 7,337,133 B1 | 2/2008 | Bezos et al. |
| 7,337,468 B2 | 2/2008 | Metzger |
| 7,346,576 B2 | 3/2008 | Lent et al. |
| 7,366,694 B2 | 4/2008 | Lazerson |
| 7,379,913 B2 | 5/2008 | Steele et al. |
| 7,380,707 B1 | 6/2008 | Fredman |
| 7,383,215 B1 | 6/2008 | Navarro et al. |
| 7,386,511 B2 | 6/2008 | Buchanan et al. |
| 7,451,113 B1 | 11/2008 | Kasower |
| 7,472,088 B2 | 12/2008 | Taylor et al. |
| 7,505,939 B2 | 3/2009 | Lent et al. |
| 7,527,967 B2 | 5/2009 | Chao et al. |
| 7,529,698 B2 | 5/2009 | Joao |
| 7,542,993 B2 | 6/2009 | Satterfield et al. |
| 7,546,619 B2 | 6/2009 | Anderson et al. |
| 7,556,192 B2 | 7/2009 | Wokaty, Jr. |
| 7,571,139 B1 | 8/2009 | Giordano et al. |
| 7,580,856 B1 | 8/2009 | Pliha |
| 7,590,589 B2 | 9/2009 | Hoffberg |
| 7,610,229 B1 | 10/2009 | Kornegay |
| 7,610,257 B1 | 10/2009 | Abrahams |
| 7,647,274 B2 | 1/2010 | Peterson et al. |
| 7,653,592 B1 | 1/2010 | Flaxman |
| 7,657,569 B1 | 2/2010 | Semprevivo et al. |
| 7,672,865 B2 | 3/2010 | Kumar et al. |
| 7,689,505 B2 | 3/2010 | Kasower |
| 7,698,236 B2 | 4/2010 | Cox et al. |
| 7,711,635 B2 | 5/2010 | Steele et al. |
| 7,730,509 B2 | 6/2010 | Boulet et al. |
| 7,853,493 B2 | 12/2010 | DeBie et al. |
| 7,860,786 B2 | 12/2010 | Blackburn et al. |
| 7,962,501 B1 | 6/2011 | Semprevivo et al. |
| 7,970,672 B2 | 6/2011 | Mendelovich et al. |
| 7,991,689 B1 | 8/2011 | Brunzell et al. |
| 8,027,888 B2 | 9/2011 | Chandran et al. |
| 8,078,524 B2 | 12/2011 | Crawford et al. |
| 8,412,593 B1 | 4/2013 | Song et al. |
| 8,799,148 B2 | 8/2014 | Chandran |
| 2001/0011245 A1 | 8/2001 | Duhon |
| 2001/0034618 A1 | 10/2001 | Kessler et al. |
| 2001/0039523 A1 | 11/2001 | Iwamoto |
| 2001/0049672 A1 | 12/2001 | Moore et al. |
| 2002/0004735 A1 | 1/2002 | Gross |
| 2002/0010594 A1 | 1/2002 | Levine |
| 2002/0023051 A1 | 2/2002 | Kunzle et al. |
| 2002/0035511 A1 | 3/2002 | Haji et al. |
| 2002/0040339 A1 | 4/2002 | Dhar et al. |
| 2002/0046099 A1 | 4/2002 | Frengut et al. |
| 2002/0049968 A1 | 4/2002 | Wilson et al. |
| 2002/0059095 A1 | 5/2002 | Cook |
| 2002/0069122 A1 | 6/2002 | Yun et al. |
| 2002/0072975 A1 | 6/2002 | Steele et al. |
| 2002/0077964 A1 | 6/2002 | Brody et al. |
| 2002/0099641 A1 | 7/2002 | Mills et al. |
| 2002/0107849 A1 | 8/2002 | Hickey et al. |
| 2002/0123904 A1 | 9/2002 | Amengual et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133404 A1 | 9/2002 | Pedersen |
| 2002/0143620 A1 | 10/2002 | Kraus |
| 2002/0147617 A1 | 10/2002 | Schoenbaum et al. |
| 2002/0147669 A1 | 10/2002 | Taylor et al. |
| 2002/0147695 A1 | 10/2002 | Khedkar et al. |
| 2002/0169747 A1 | 11/2002 | Chapman et al. |
| 2002/0184054 A1 | 12/2002 | Cox et al. |
| 2002/0188478 A1 | 12/2002 | Breeland et al. |
| 2002/0194050 A1 | 12/2002 | Nabe et al. |
| 2002/0194103 A1 | 12/2002 | Nabe |
| 2002/0194120 A1 | 12/2002 | Russell et al. |
| 2003/0009418 A1 | 1/2003 | Green et al. |
| 2003/0018549 A1 | 1/2003 | Fei et al. |
| 2003/0028402 A1 | 2/2003 | Ulrich et al. |
| 2003/0033242 A1 | 2/2003 | Lynch et al. |
| 2003/0036926 A1 | 2/2003 | Starkey et al. |
| 2003/0036996 A1 | 2/2003 | Lazerson |
| 2003/0037054 A1 | 2/2003 | Dutta et al. |
| 2003/0046112 A1 | 3/2003 | Dutta et al. |
| 2003/0050795 A1 | 3/2003 | Baldwin, Jr. et al. |
| 2003/0050796 A1 | 3/2003 | Baldwin, Jr. et al. |
| 2003/0065563 A1 | 4/2003 | Elliott et al. |
| 2003/0078877 A1 | 4/2003 | Beirne et al. |
| 2003/0097342 A1 | 5/2003 | Whittingtom |
| 2003/0135460 A1 | 7/2003 | Talegon |
| 2003/0144907 A1 | 7/2003 | Cohen, Jr. et al. |
| 2003/0172002 A1 | 9/2003 | Spira et al. |
| 2003/0208412 A1 | 11/2003 | Hillestad et al. |
| 2003/0216965 A1 | 11/2003 | Libman |
| 2003/0229507 A1 | 12/2003 | Perge |
| 2003/0233259 A1 | 12/2003 | Mistretta et al. |
| 2003/0233323 A1 | 12/2003 | Bilski et al. |
| 2003/0236738 A1 | 12/2003 | Lange et al. |
| 2004/0006536 A1 | 1/2004 | Kawashima et al. |
| 2004/0030629 A1 | 2/2004 | Freeman et al. |
| 2004/0044563 A1 | 3/2004 | Stein |
| 2004/0049473 A1 | 3/2004 | Gower et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078809 A1 | 4/2004 | Drazin |
| 2004/0107125 A1 | 6/2004 | Guheen et al. |
| 2004/0107132 A1 | 6/2004 | Honarvar et al. |
| 2004/0107161 A1 | 6/2004 | Tanaka et al. |
| 2004/0111358 A1 | 6/2004 | Lange et al. |
| 2004/0122730 A1 | 6/2004 | Tucciarone et al. |
| 2004/0122735 A1 | 6/2004 | Meshkin |
| 2004/0139025 A1 | 7/2004 | Coleman |
| 2004/0143482 A1 | 7/2004 | Tivey et al. |
| 2004/0163101 A1 | 8/2004 | Swix |
| 2004/0177030 A1 | 9/2004 | Shoham |

(56) References Cited

U.S. PATENT DOCUMENTS

| | | |
|---|---|---|
| 2004/0177035 A1 | 9/2004 | Silva |
| 2004/0199456 A1 | 10/2004 | Flint et al. |
| 2004/0199584 A1 | 10/2004 | Kirshenbaum et al. |
| 2004/0205157 A1 | 10/2004 | Bibelnieks et al. |
| 2004/0215556 A1 | 10/2004 | Merkley, Jr. et al. |
| 2004/0236688 A1 | 11/2004 | Bozeman |
| 2004/0267660 A1 | 12/2004 | Greenwood et al. |
| 2005/0021397 A1 | 1/2005 | Cui et al. |
| 2005/0044036 A1 | 2/2005 | Harrington et al. |
| 2005/0065874 A1 | 3/2005 | Lefner et al. |
| 2005/0086071 A1 | 4/2005 | Fox, Jr. et al. |
| 2005/0086072 A1 | 4/2005 | Fox, Jr. et al. |
| 2005/0086579 A1 | 4/2005 | Leitner et al. |
| 2005/0131760 A1 | 6/2005 | Manning et al. |
| 2005/0137912 A1 | 6/2005 | Rao et al. |
| 2005/0137939 A1 | 6/2005 | Calabria et al. |
| 2005/0144067 A1 | 6/2005 | Farahat et al. |
| 2005/0154664 A1 | 7/2005 | Guy et al. |
| 2005/0159993 A1 | 7/2005 | Kordas et al. |
| 2005/0187860 A1 | 8/2005 | Peterson et al. |
| 2005/0209880 A1 | 9/2005 | Drelicharz et al. |
| 2005/0209922 A1 | 9/2005 | Hofmeister |
| 2005/0222906 A1 | 10/2005 | Chen |
| 2005/0228748 A1 | 10/2005 | Togher et al. |
| 2005/0251820 A1 | 11/2005 | Stefanik et al. |
| 2005/0278743 A1 | 12/2005 | Flickinger et al. |
| 2005/0279830 A1 | 12/2005 | Chao |
| 2005/0288954 A1 | 12/2005 | McCarthy et al. |
| 2006/0004731 A1 | 1/2006 | Seibel et al. |
| 2006/0041443 A1 | 2/2006 | Horvath |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0095363 A1 | 5/2006 | May |
| 2006/0100954 A1 | 5/2006 | Schoen |
| 2006/0106670 A1 | 5/2006 | Cai et al. |
| 2006/0111940 A1 | 5/2006 | Johnson et al. |
| 2006/0155639 A1 | 7/2006 | Lynch et al. |
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0206379 A1 | 9/2006 | Rosenberg |
| 2006/0212353 A1 | 9/2006 | Roslov et al. |
| 2006/0223043 A1 | 10/2006 | Dancy-Edwards et al. |
| 2006/0224696 A1 | 10/2006 | King et al. |
| 2006/0233332 A1 | 10/2006 | Toms |
| 2006/0235743 A1 | 10/2006 | Long et al. |
| 2006/0242039 A1 | 10/2006 | Haggerty et al. |
| 2006/0242046 A1 | 10/2006 | Haggerty et al. |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0253309 A1 | 11/2006 | Ramsey et al. |
| 2006/0265323 A1 | 11/2006 | Winter et al. |
| 2006/0282359 A1 | 12/2006 | Nobili et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0016500 A1 | 1/2007 | Chatterji et al. |
| 2007/0016501 A1 | 1/2007 | Chatterji et al. |
| 2007/0022011 A1 | 1/2007 | Altberg et al. |
| 2007/0022032 A1 | 1/2007 | Anderson et al. |
| 2007/0061195 A1 | 3/2007 | Liu et al. |
| 2007/0061243 A1 | 3/2007 | Ramer et al. |
| 2007/0067206 A1 | 3/2007 | Haggerty et al. |
| 2007/0067234 A1 | 3/2007 | Beech et al. |
| 2007/0067297 A1 | 3/2007 | Kublickis |
| 2007/0078741 A1 | 4/2007 | Haggerty et al. |
| 2007/0078835 A1 | 4/2007 | Donnelli |
| 2007/0100708 A1 | 5/2007 | Smith et al. |
| 2007/0100719 A1 | 5/2007 | Chwast et al. |
| 2007/0112668 A1 | 5/2007 | Celano et al. |
| 2007/0118410 A1 | 5/2007 | Nadai |
| 2007/0118435 A1 | 5/2007 | Ran |
| 2007/0174114 A1 | 7/2007 | Bigby et al. |
| 2007/0192165 A1 | 8/2007 | Haggerty et al. |
| 2007/0192409 A1 | 8/2007 | Kleinstern et al. |
| 2007/0198336 A1 | 8/2007 | Thompson |
| 2007/0198407 A1 | 8/2007 | Winter |
| 2007/0208619 A1 | 9/2007 | Branam et al. |
| 2007/0226047 A1 | 9/2007 | Ward |
| 2007/0226130 A1 | 9/2007 | Haggerty et al. |
| 2007/0233857 A1 | 10/2007 | Cheng et al. |
| 2007/0239721 A1 | 10/2007 | Ullman et al. |
| 2007/0244732 A1 | 10/2007 | Chatterji et al. |
| 2007/0258626 A1 | 11/2007 | Reiner |
| 2007/0260692 A1 | 11/2007 | Burgoyne et al. |
| 2007/0262140 A1 | 11/2007 | Long, Sr. |
| 2007/0279187 A1 | 12/2007 | Hekmatpour et al. |
| 2007/0282684 A1 | 12/2007 | Prosser et al. |
| 2007/0288271 A1 | 12/2007 | Klinkhammer |
| 2007/0288950 A1 | 12/2007 | Downey et al. |
| 2007/0288953 A1 | 12/2007 | Sheeman et al. |
| 2007/0299682 A1 | 12/2007 | Roth et al. |
| 2007/0299699 A1 | 12/2007 | Policelli et al. |
| 2008/0005313 A1 | 1/2008 | Flake et al. |
| 2008/0010206 A1 | 1/2008 | Coleman |
| 2008/0015979 A1 | 1/2008 | Bentley |
| 2008/0028067 A1 | 1/2008 | Berkhin et al. |
| 2008/0052195 A1 | 2/2008 | Roth et al. |
| 2008/0059361 A1 | 3/2008 | Roth et al. |
| 2008/0059362 A1 | 3/2008 | Roth et al. |
| 2008/0065569 A1 | 3/2008 | Dutt et al. |
| 2008/0086400 A1 | 4/2008 | Ardelean et al. |
| 2008/0091519 A1 | 4/2008 | Foss |
| 2008/0103960 A1 | 5/2008 | Sweeney |
| 2008/0109315 A1 | 5/2008 | Huang et al. |
| 2008/0109444 A1 | 5/2008 | Williams et al. |
| 2008/0109445 A1 | 5/2008 | Williams et al. |
| 2008/0120133 A1 | 5/2008 | Krishnaswami et al. |
| 2008/0120155 A1 | 5/2008 | Pliha |
| 2008/0126238 A1 | 5/2008 | Banbury et al. |
| 2008/0133322 A1 | 6/2008 | Kalia et al. |
| 2008/0140507 A1 | 6/2008 | Hamlisch et al. |
| 2008/0177836 A1 | 7/2008 | Bennett |
| 2008/0183675 A1 | 7/2008 | Schwarz |
| 2008/0184289 A1 | 7/2008 | Cristofalo et al. |
| 2008/0189202 A1 | 8/2008 | Zadoorian et al. |
| 2008/0208841 A1 | 8/2008 | Zeng et al. |
| 2008/0221972 A1 | 9/2008 | Megdal |
| 2008/0222027 A1 | 9/2008 | Megdal et al. |
| 2008/0228635 A1 | 9/2008 | Megdal et al. |
| 2008/0255897 A1 | 10/2008 | Megdal et al. |
| 2008/0255922 A1 | 10/2008 | Feldman et al. |
| 2008/0270209 A1 | 10/2008 | Mauseth et al. |
| 2008/0270295 A1 | 10/2008 | Lent et al. |
| 2008/0275777 A1 | 11/2008 | Protheroe et al. |
| 2008/0288283 A1 | 11/2008 | Baldwin, Jr. et al. |
| 2008/0294501 A1 | 11/2008 | Rennich et al. |
| 2008/0294540 A1 | 11/2008 | Celka et al. |
| 2008/0301727 A1 | 12/2008 | Cristofalo et al. |
| 2009/0018996 A1 | 1/2009 | Hunt et al. |
| 2009/0024484 A1 | 1/2009 | Walker et al. |
| 2009/0037317 A1 | 2/2009 | Zhou et al. |
| 2009/0044246 A1 | 2/2009 | Sheehan et al. |
| 2009/0044279 A1 | 2/2009 | Crawford et al. |
| 2009/0055268 A1 | 2/2009 | Knoller et al. |
| 2009/0094640 A1 | 4/2009 | Anderson et al. |
| 2009/0099909 A1 | 4/2009 | Phan |
| 2009/0106094 A1 | 4/2009 | DeLine et al. |
| 2009/0133058 A1 | 5/2009 | Kouritzin et al. |
| 2009/0164300 A1 | 6/2009 | Gupta et al. |
| 2009/0171710 A1 | 7/2009 | Shrivathsan et al. |
| 2009/0171721 A1 | 7/2009 | LeBaron et al. |
| 2009/0216642 A1 | 8/2009 | Ho et al. |
| 2009/0222308 A1 | 9/2009 | Zoldi et al. |
| 2009/0248534 A1 | 10/2009 | Dasdan et al. |
| 2009/0248573 A1 | 10/2009 | Haggerty et al. |
| 2009/0276244 A1 | 11/2009 | Baldwin, Jr. et al. |

(56) References Cited

U.S. PATENT DOCUMENTS

| | | | |
|---|---|---|---|
| 2009/0288109 A1 | 11/2009 | Downey et al. | |
| 2009/0307104 A1 | 12/2009 | Weng | |
| 2010/0023447 A1 | 1/2010 | Mac Innis | |
| 2010/0023448 A1 | 1/2010 | Eze | |
| 2010/0037255 A1 | 2/2010 | Sheehan et al. | |
| 2010/0138290 A1 | 6/2010 | Zschocke et al. | |
| 2011/0137730 A1 | 6/2011 | McCarney et al. | |
| 2015/0120437 A1 | 4/2015 | Chandran et al. | |
| 2015/0373224 A1* | 12/2015 | Kusakabe | H04N 1/32128 358/1.15 |
| 2016/0275605 A1 | 9/2016 | Chandran et al. | |
| 2017/0032252 A1* | 2/2017 | Feminella | G06Q 30/02 |
| 2020/0042648 A1* | 2/2020 | Rao | G06Q 30/0631 |
| 2020/0319830 A1* | 10/2020 | Kaneda | G06F 3/1238 |
| 2020/0320609 A1* | 10/2020 | Rajapurohit | G06Q 30/0641 |
| 2021/0299569 A1* | 9/2021 | Civin | G06N 20/00 |
| 2022/0198779 A1* | 6/2022 | Saraee | G06Q 30/0241 |

FOREIGN PATENT DOCUMENTS

| | | |
|---|---|---|
| EP | 0 869 652 | 10/1998 |
| EP | 0 913 789 | 5/1999 |
| EP | 1 028 401 | 8/2000 |
| EP | 1 122 664 | 8/2001 |
| JP | 2003-016261 | 1/2003 |
| WO | WO 94/012943 | 6/1994 |
| WO | WO 95/012857 | 5/1995 |
| WO | WO 97/023838 | 7/1997 |
| WO | WO 99/004350 | 1/1999 |
| WO | WO 99/046710 | 9/1999 |
| WO | WO 00/011574 | 3/2000 |
| WO | WO 01/004821 | 1/2001 |
| WO | WO 01/039589 | 6/2001 |
| WO | WO 01/041083 | 6/2001 |
| WO | WO 01/041355 | 6/2001 |
| WO | WO 01/057720 | 8/2001 |
| WO | WO 01/075754 | 10/2001 |
| WO | WO 01/084281 | 11/2001 |
| WO | WO 02/013047 | 2/2002 |
| WO | WO 03/101123 | 12/2003 |
| WO | WO 2004/114160 | 12/2004 |
| WO | WO 2005/022348 | 3/2005 |
| WO | WO 2006/099492 | 9/2006 |
| WO | WO 2007/149941 | 12/2007 |
| WO | WO 2008/021061 | 2/2008 |

OTHER PUBLICATIONS

"An even better solution to financing elective surgery . . . ," Unicorn Financial, 7 pgs., as downloaded from http://web.archive.org/web/20000816161359/http://www.unicornfinancial.com/ [Oct. 15, 2008 3:45:25 PM].

An Expert System for Determining Medicaid Eligibility, Journal of Medical Systems, vol. 12, Nov. 5, 1988, in 10 pages.

"Atlas On Demand, Concurrent, and Everstream Strike Video-On-Demand Advertising Alliance: Leading Technology Providers to Integrate Technologies and Market Solutions Enabling Advertisers to Take Advantage of Emerging Digital Television", atlassolutions.com, Jul. 13, 2006, 3 pages, http://www.atlassolutions.com/news_20060713.aspx. (web printout on Oct. 4, 2007).

"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs., available at http:////www.access.gpo.gov/congress/house.

"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].

"Epsilon Leads Discussion on Paradigm Shift in TV Advertising," epsilon.com, Jun. 24, 2004, 2 pages, http://www.epsilon.com/who-pr_tvad040624.html. (web printout Oct. 4, 2007).

"Impac Funding Introduces Enhanced Website for Static Pool Tracking of MBS Transactions," Webpage printed out from http://www.lewtan.com/press/1208044_Impac-Lewtan.htm on Mar. 20, 2008.

"IRI and Acxiom Introduce More Efficient and Actionable Approach To Consumer Segmentation and Targeted Marketing," eu-marketingportal.de, Jan. 26, 2006, 2 pages, http://www.eu-marketingportal.de/web/index.cfm/IRI_and_Acxiom_Introduce_More_Efficient_and_Acti . . . (web printout on Oct. 5, 2007).

"JPMorgan Worldwide Securities Services to Acquire Paloma's Middle and Back Office Operations," Webpage printed from http://www.jpmorgan.com on Apr. 1, 2009.

"Zoot's Hosted Environment," Webpage printed fromhttp://www.zootweb.com/zootasp.html on Mar. 3, 2008.

"Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=4282. (web printout on Oct. 5, 2007).

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159. (web printout on Oct. 4, 2007).

"Arbitron 2006 Black Consumers," Arbitron Inc., lvtsg.com, Jul. 8, 2006, 2 pages, http://www.lvtsg.com/news/publish/Factoids/article_3648.shtml. (web printout on Sep. 6, 2007).

"Atlas On Demand and C-COR Join Forces to Offer Advertising Management Solution for On Demand TV: Global Provider of On Demand Systems Partners with Atlas to Develop and Market Comprehensive VOD Advertising Solution," atlassolutions.com, Jul. 25, 2005, 3 pages, http://www.atlassolutions.com/news_20050725.aspx. (web printout on Oct. 5, 2007).

"Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Barriers," Jun. 22, 2006, 3 pages, http://www.atlassolutions.com/news_20060622.aspx. (web printout date on Oct. 5, 2007).

"Cable Solution Now, The Industry Standard For Information Management: Strata's TIM.net Crosses Important Threshold Dominant Solution for All Top 20 TV Markets," stratag.com, Apr. 28, 2006, 1 page, http://stratag.com/news/cablepress042806.html. (web printout on Oct. 4, 2007).

Calnan, Christopher, "Tenet, Fair Isaac invest $20M in startup," MHT, Mass High Tech: The Journal of New England Technology, dated Jul. 23, 2007, 2 pgs.

Capps, Randy et al., "Recent Changes in Texas Welfare and Work, Child Care and Child Welfare Systems," Assessing the New Federalism, The Urbane Institute, State Update No. 1, 24 pgs., Jun. 2001.

CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].

Cheney, Karen, "Fix Your Nose, If You Wish, But Not With This New Loan," Money Magazine, vol. 27, No. 5, 1 pg., dated May 1, 1998.

"Claritas Forms Life Insurance Consortium with Worldwide Financial Services Association: Initiative with LIMRA International is First of its Kind to Provide Actual Sales Information at Small Geographic Areas," claritas.com, Feb. 9, 2006, 3 pages, http://www.claritas.com/claritas/Default.jsp?ci=5&si=1&pn=limra. (web printout on Oct. 4, 2007).

"Claritas Introduces PRIZM NE Consumer Electronic Monitor Profiles: New Information Product Provides Insight Into The Public's Purchasing Behaviors of Consumer Electronics," claritas.com May 30, 2006, 3 pages. (printout on Sep. 6, 2007).

"Information Resources, Inc. and Navic Networks From Joint Relationship to Support Next Generation of Technology for Advertising Testing," IRI Expands BehaviorScan® Solution to Meet Digital and On-demand Needs, infores.com, Feb. 27, 2006, 2 pages,

(56) References Cited

OTHER PUBLICATIONS http://web.archive.org/web/20071009201023/http://us.infores.com/page/news/pr/pr_archive?mode=single&pr_id=117.

"Mediamark Research Inc. Releases Findings From Mobile Marketing Consumer Study; Outback Steakhouse and Royal Caribbean Cruise Lines Among Brands Participating in Mobile Marketing Research," thefreelibrary.com, May 9, 2006, 4 pages, http://thefreelibrary.com/Mediamark+Research+Inc.+Releases+Findings+From+Mobil+Marketing . . . (web printout on Oct. 4, 2007).

"Directions Magazine: SRC Announces Free Dashups to Mashups Adding Geographic Business Intelligence at Web Speed to the Enterprise on www.FreeDemographics.com/API," directionsmagazine.com, Jun. 12, 2006, 3 pages, http://www.directionsmag.com/press.releases/index.php?duty=Show&id=14532&trv=1. (web printout on Oct. 4, 2007).

"SRC Delivers Industry's First Drive Time Engine Developed to Follow Actual Road Networks," thomasnet.com, May 21, 2006, 4 pages, http://news.thomasnet.com/companystory/485722. (web printout on Oct. 4, 2007).

"VOD Integration Now Available In Strata: Buyers / Sellers Benefit from VOD Component on Popular Platform," stratag.com, Feb. 21, 2006, 1 page, http://www.stratag.com/news/mediapress022106.html. (web printout on Oct. 4, 2007).

AdWeek, "Aim High: Ad Targeting Moves to the Next Level," Jan. 21, 2008, 3 pages, http://www.adweek.com/aw/magazine/article_display.isp?vnu_content_id=1003695822. (web printout on Apr. 16, 2008).

Adzilla, Press Release, "ZILLACASTING technology approved and patent pending," May 16, 2005, 2 pages, http://www.adzilla.com/newsroom/pdf/patent_051605. (pdf on May 28, 2008).

AFX News Limited—AFX International Focus, "Nielsen moving to measure off-TV viewing," Jun. 14, 2006, 1 page.

Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].

Belford, Terrence, "Technology Quarterly: Computers Internet speeds credit checks System tailored for doctors, dentists," The Globe and Mail (Canada), Section: Report on Business Special Reports, dated Mar. 18, 1997, 2 pgs.

Boss, Shira J. "Elective Surgery Without the Plastic: Low-Interest Medical Financing Provides Alternative to Credit Cards," factiva, Crain's New York Business, 2 pgs., dated Jun. 22, 1998.

Broward County CAP Grant Application, 41 pgs., as printed on Aug. 10, 2009.

Burr Ph.D., et al., Utility Payments as Alternative Credit Data: A Reality Check, Asset Builders of America, Inc., Dec. 15, 2006, pp. 1-18, Washington, D.C.

Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353. (web printout Oct. 4, 2007).

"New Fair Isaac Qualify Score Helps Businesses Reduce Customer Acquisition Costs and Expand Marketing Opportunities," Business Wire, Jun. 21, 2004, New York, p. 1.

Card Marketing, Use the Latest CRM Tools and Techniques, www.CardForum.com, vol. 5 No. 10, Dec. 2001.

"Financing Medical Procedures A Lucrative But Risky Business," Credit Risk Management Report, vol. 10, Issue 15, 2 pgs., dated Aug. 7, 2000.

"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Invitational Conference Planning Committee and Particpating Organizations/Agencies, held Sep. 26-27, 1999, available at http://www.pediatrics.org/cgi/content/full/105/4/906.

Rodgers, Zachary, "ISPs Collect User Data for Behavioral Ad Targeting—Click Z—Print Article: ISPs Collect User Data for Behavioral Ad Targeting," dated Jan. 3, 2008, 3 pages, http://www.clickz.com/showPage.html?page=clickz. (web printout on Apr. 16, 2008).

Mills, Elinor, "Target me with your ads, please," cnet news.com, Dec. 5, 2007, 2 pages, http://www.news.com/2102-1024_3-6221241.html?tag+st.util. (printout on Mar. 18, 2008).

Creamer, Matthew, "Consulting in marketing; Accenture, others playing role in firms' processes," Crain's Chicago Business, Jun. 12, 2006, 2 pages, Crain Communications.

Delany, Kevin J., et al. Firm Mines Offline Data To Target Online Ads; Commercial Alert, 2007, http://www.commercialalert.org/news/archive/2007/10/firm-mines-offline . . . (printout on Apr. 22, 2008).

demographicsnow.com, sample reports, "Age Rank Report", Jul. 17, 2006, 3 pages.

demographicsnow.com, sample reports, "Consumer Expenditure Summary Report", Jul. 17, 2006, 3 pages.

demographicsnow.com, sample reports, "Income Comparison Report", Jul. 17, 2006, 4 pages.

Experian Announces PLUS Score; Experian Press Release dated Oct. 16, 2003; Experian Global Press Office.

Chung, Charles, "Multi-Channel Retailing Requires the Cleanest Data—But Don't Expect it From the Customer", Internet Retailer, Jan./Feb. 2002, pp. 61-62.

Experian, "Custom Strategist and Qualifile from Funds", 2000, 2 pages.

DentalFinancing.com, "Financial services for patients and dental professionals,", 7 pgs., as downloaded from http://web.archive.org/web/20010607151954/www.dentalfinancing.com/dentist/index.asp (1 of 2) ]Oct. 15, 2008 3:55:16 PM].

Dietz, Ellen, "Dental Office Management," 8 pgs., pp. 316-321, Copyright 2000.

EFunds Introduces QualiFileSM; Deluxe Corporation; Sep. 1999; Milwaukee, WI.

Electronic Privacy Information Center, "The Fair Credit Reporting Act" 15 USC 1681 (1992), 10 pgs., as downloaded from http://epic.org/privacy/financial/fcra.html on Mar. 19, 2008.

Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.

Ettore, Paul Kahn on Exceptional Marketing. Management Review, vol. 38(11), Nov. 1994, pp. 48-51.

Felsenthal, Edward, "Health Costs; Managed Care Helps Curb Costs, Study Says," The Wall Street Journal, dated Aug. 12, 1991.

Gilje, Shelby, "Credit Agency Moving Into Health Care," NewsRoom, Seattle Times, WA, Section: SCENE, Dated Mar. 22, 1995, 3 pgs., as downloaded from http://web2.westlaw.com/result/documenttext.aspx?rs=WLW8.03&ss+CNT&rp=%2fWelc . . . on Mar. 19, 2008.

Goldstein, Jacob, "The Newest Vital Sign: Your Credit Score," The Wall Street Journal, Health Blog, as viewed at http://blogs.wsj.com/health/2008/03/18/the-newest-vital-sign-your-cr . . . , 3 pgs.

Experian Information Solutions, Inc., "Instant Prescreen", 2000 [online] [retrieved on Aug. 11, 2005] Retrieved from the Internet URL:http://www.cdillinois.com/pdf_file/instant_prescreen_ps.pdf.

Experian Global Press Office, "Experian Enables Profitable e-Business", 2000 [online] [retrieved on Aug. 11, 2005] Retrieved from the Internet URL:http://press.experian.com/popup/sd.cfm?f=43.htm.

Experian Global Press Office, "Experian Announces Innovative e-Commerce Technology Enhancement", 2001 [online] [retrieved on Aug. 11, 2005] Retrieved from the Internet URL:http://press.experian.com/popup/sd.cfm?f=280.htm.

Experian Information Solutions, Inc., "Enabling e-business", 2001 [online] [retrieved on Aug. 11, 2005] Retrieved from the Internet URL:http://press.experian.com/documents/enablingebusiness.pdf.

Fair Isaac, "Case Study: Expanding to Non-Traditional Prescreen Marketing Channels Reduces Company's Cost Per Account Booked", 2003 [online] [retrieved on Sep. 1, 2005] Retrieved from the Internet URL:http://www.fairisaac.com/NR/rdonlyres/048FAE87-14B5-4732-970D-BDF20F09EB2D/0/MSDSRealTimeCS.pdf.

Front Porch Brochure, "Ad Networks—Partner with Front Porch!: Our Internet-Wide Behavioral Targeting Brings Ad Networks Higher Revenue!", 2 pages.

(56) References Cited

OTHER PUBLICATIONS

Front Porch Brochure, "New Free Revenue for Broadband ISPs!: Get your share of the $20 billion online advertising market!", 2 pages.
Halliday, Jean, "Ford recruits Accenture for marketing plan," Automotive News, Feb. 13, 2006, 2 pages, Crain Communications.
Helm, Burt, "Nielsen's New Ratings Yardstick," businessweek. com, Jun. 20, 2006, 3 pages, http://www.businessweek.com/technology/content/jun2006/tc20060620_054223.htm. (web printout on Sep. 6, 2007).
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html. (web printout on Oct. 4, 2007).
Henry, M.D., Kimberly A., "The Face-Lift Sourcebook," copyright 2000, 3 pgs. (p. 207).
Ideon, Credit-Card Registry that Bellyflopped this Year, Is Drawing some Bottom-Fishers, The Wall Street Journal, Aug. 21, 1995, pp. C2.
IndiCareTM, On-Line Patient Assistant Program, Website Users Manual; JBI Associates, LLC; 1997.
"Why Should You Use LeadVerifier?", LeadVerifier, https://web.archive.org/web/20051105043240/www.leadverifier.com/LeadVerifier_Why.asp, as archived Nov. 5, 2005, pp. 2.
Lee, W.A., "Experian Eyes Payments, Mulls Deals" American Banker, May 30, 2003 in 2 pages.
Lee, W.A., "Money, Quicken, and the Value of Alliances", American Banker, Jul. 17, 2003 in 2 pages.
Littwin, Angela, "Beyond Usury: A Study of Credit-Card Use and Preference Among Low-Income Consumers", Texas Law Review, vol. 86, No. 3, pp. 451-506; Feb. 2008.
"Main Page—Predictive Behavioral Targeting," 4 pages, http://www.predictive-behavioral-targeting.com/index.php.Main_Page. (web printout on Mar. 28, 2008).
NebuAD, Wall Street Journal Online, "Venture Capital: What's New—The Latest on Technology Deals From Dow Jones VentureWire", Oct. 22, 2007, 1 page, http://www.nebuad.com/company/media_coverage/media_10_22_07.php. (web printout on May 29, 2008).
Phorm, "The Open Internet Exchange: Introducing the OIX", 2 pages, http://www.phorm.com/oix. (web printout Apr. 16, 2008).
Phorm, "Lauch Agreement: Press Release: BT PLC, Talk Talk and Virgin Media Inc. confirm exclusive agreements with Phorm", 2 pages, http://www.phorm.com/about/launch_agreement.php. (web printout on Apr. 16, 2008).
"Anchor Launches LeadVerifier to Verify, Correct and Enhance Internet Leads", PR Web: Press Release Newswire, Farmingdale, NY, Aug. 8, 2005, pp. 2.
"Experian's VeriScore(SM) Delivers Increased Customer Acquisition and Investment Return for Top Financial Institutions," PR Newswire, Jul. 28, 2004, New York, p. 1.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007, pp. 2.
Reinbach, MCIF aids banks in CRA compliance, Bank Systems & Technology, vol. 32, No. 8, pp. 27, Aug. 1995.
Singletary, Michelle "Ratings for the Credit Raters", The Washington Post, The Color of Money column, Mar. 24, 2002 in 1 page.
TARGUSinfo: Lead Verification, Verify Your Leads with Unique Accuracy and Ease, downloaded from www.targusinfo.com/solutions/verify/Default.asp, as printed Aug. 1, 2006, pp. 1.
UPI, "Nielsen Media Research goes electronic," Jun. 14, 2006, 1 page.
Washington State Office of Public Defense, "Criteria and Standards for Determining and Verifying Indigency," dated Feb. 9, 2001.
Watts, Craig, "Consumers Now Can Know What Loan Rate Offers to Expect Based on Their FICO Credit Score at MyFICO.com", Mar. 6, 2002, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health", May 21, 2002, http://www.myfico.com/PressRoom/PressReleases/2002_05_21.aspx.
Webpage printed from http://www.magnum.net/pdfs/RapUpBrochure.pdf as printed Mar. 3, 2008.
Whitney, Daisy, "Atlas Positioning to Shoulder VOD Ads; Campaign Management Tools Optimize Inventory," goliath.com, May 23, 2005, 3 pages, http://www.goliath.ecnext.com/coms2/gi_0199-4340604/Atlas-Positioning-to-shoulder-VOD.html.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08/hhs08.html on Apr. 9, 2008.
Wisconsin Department of Workforce Development, BadgerCare Medicaid Application Credit Report Authorization Form, dated Jun. 21, 2001.
Wisconsin Department of Workforce Development, BadgerCare Medicaid Notification of Eligibility, dated Jul. 25, 2000.
ZOOT "Instant Rules GUI" printed Mar. 3, 2008 www.zootweb.com/instant_rules_GUI.html in 1 page.
ZOOT "Rules Management GUI" printed Mar. 3, 2008 www.zootweb.com/rules_management_GUI.html in 1 page.
Zoot—Decision Engine, www.zootweb.com/decision_engine.html, as printed on Mar. 3, 2008.
Zoot—Pre-Built Standard Attributes, www.zootweb.com/credit_attributes.html as printed Mar. 3, 2008.
Rubin, Rita, "Cosmetic Surgery On Credit Finance Plans let Patients Reconstruct Now, Pay Later," The Dallas Morning News, 2 pgs., dated Sep. 10, 1988.
SearchAmerica, Solutions, "Payment Advisor Suite TM," 2008.
Selz, Michael, "Lenders Find Niche In Cosmetic Surgery That Isn't Insured—But Since You Can't Repossess A Nose Job, Risks Aren't Restricted to the Patients," Wall Street Journal, New York, N.Y., Jan. 1997, p. A.1, 3 pgs., as downloaded from http://proquest.umi.com.libproxy.mit.edu/pqdweb?index=0&sid=1srchmode=1&vinst=, Oct. 14, 2008.
Stein, Benchmarking Default Prediction Models: Pitfalls and Remedies in Model Validation, Moody's KMV, Revised Jun. 13, 2002, Technical Report #020305; New York.
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
Thomas, David, "Report on Networks and Electronic Communications Newcourt Credit turns to extranet Services / A PC connects to 1,200 users at once." The Globe and Mail (Canada), Section: Report on Business Special Report, 2 pgs., dated Nov. 12, 1996.
NewsRoom, Insurance Regulator, State Survey, "CIGNA Report Withdrawn As Foe Sees Opening," Sep. 9, 1996, vol. 8, Issue 34, 4pgs, as downloaded at http://web2.westlaw.com/result/documenttext.aspx?rs=WLW8.03&ss=CNT&rp=%2fWelc on Mar. 19, 2008.
Pennsylvania Law Weekly, "Discriminating Against Victims Admitting Domestic Abuse Can Lead To Denial Of Insurance Coverage," vol. XVIII, No. 26, dated Jun. 26, 1996, 2 pgs., as downloaded from http://web2.westlaw.com/result/documenttext.aspx?rs=WLW8.03&ss=CNT&rp=%2fWelc on Mar. 19, 2008.
Kent, Heather, "Huge declines in price as competition heats up in Vancouver's booming laser-surgery market," CMAJ, Oct. 5, 1999; 161 (7), pp. 857-858.
Lavelle, Marianne, "Health Plan Debate Turning to Privacy Some Call For Safeguards On Medical Disclosure. Is A Federal Law Necessary?," The National Law Journal, vol. 16, No. 39, dated May 30, 1994, as downloaded from http://web2.westlaw.com/result/documenttext.aspx?rs=WLW8.03&ss=CNT&rp=%2fWelc . . . on Mar. 19, 2008.
Magid, Lawrence, J. , Business Tools: When Selecting an ASP Ensure Data Mobility, Los Angeles Times, Feb. 26, 2001, vol. C, Issue 4, pp. 3 pages, Los Angeles, CA.

(56) References Cited

OTHER PUBLICATIONS

Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., NewsRoom, Greensboro News & Record (NC), Section: General News, "Homeless, Pregnant and Alone Dana Sides Knows Her Baby Is Likely to Come in a Month, but She Has No Idea Where She Will Go After Leaving the Hospital," dated Dec. 6, 2001.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
"MediCredit Announces Major Investment from Medstone; Financing Will Enable Dramatic Expansion of Online Services," Business Wire, 2 pgs, dated May 12, 2000.
"Web Site Fuels Elective Surgery Trend; The Complete Resource to Paying for Cosmetic Surgery, Laser Vision Correction and Cosmetic Dentistry," Business Wire, 2 pgs, dated Apr. 7, 1999.
State of Wisconsin, Division of Health Care Financing, Department of Health and Family Services: 1999-2001 Biennial Report, pp. 17-21.

\* cited by examiner

Thank you for your order!!

You have been pre-approved for the following credit card, which may be used to pay for your order!

You're Pre-Approved!

Platinum Card

| Interest Rate | Intro Rate | Grace Period | Credit Limit | Annual Fee |
|---|---|---|---|---|
| 9.24% | 0% | 20 Days | No Limit | $0 |

Our Overview
0% on Balance Transfers & Purchases For 12 months. NO Balance Transfer fee, NO annual fee. Plus, access to Identity Theft Solutions, $0 Liability on unauthorized purchases and Secure, free online account ▶ Click Here To Get Your Card Now ▶ Show me additional pre-approved offers
▶ No thanks, I'll pay with another payment source

- Credit line up to $100,000 with Platinum Card
- Introductory 0% Annual Percentage Rate (APR) for cash advance checks and balance transfers through your first twelve billing cycles*
- Zero Liability for unauthorized card use**
- Earn reward points to redeem airline and car rental benefits as well as gift certificate/cards redeemable at top retailer and restaurants.

FIG. 7

Congratulations! We found your match

You're Pre-Approved!

Based on your profile you are pre-approved for these 3 credit cards.

| Card Name | Platinum Card | Drivers Card | Student Card |
|---|---|---|---|
| | Click to Apply | Click to Apply | Click to Apply |
| Interest Rate | 9.24% | 10.24% | 9.24% |
| Intro Rate | 0% | 0% | 0% |
| Grace Period | 20 Days | 20 Days | 20 Days |
| Credit Limit | No Limit | No Limit | No Limit |
| Annual Fee | None | None | None |
| Our Overview | 0% on Balance Transfers & Purchases For 12 months. NO Balance Transfer fee. NO annual fee. Plus, access to Identify Theft Solutions, $0 Liability on unauthorized purchases and Secure, free online account management. | 0% on Balance Transfers & Purchases For 12 months. NO Balance Transfer fee. NO annual fee. Plus, access to Identify Theft Solutions, $0 Liability on unauthorized purchases and Secure, free online account management. | 0% on Balance Transfers & Purchases For 12 months. NO Balance Transfer fee. NO annual fee. Plus, access to Identify Theft Solutions, $0 Liability on unauthorized purchases and Secure, free online account management. |

No thanks, pass on these offers and show me other credit cards I might be interested in.

Home | Rewards Calculator | Credit Report Overview | Mortgage Overview | FAQs | About Us | Contact Us

AUTOMATICALLY DETERMINING A PERSONALIZED SET OF PROGRAMS OR PRODUCTS INCLUDING AN INTERACTIVE GRAPHICAL USER INTERFACE

BACKGROUND OF THE INVENTION

Field of the Invention

This invention relates to systems and methods of automatically determining and ranking prescreened programs or products based on user characteristics and/or geographic location.

SUMMARY

In one embodiment, a computerized system for presenting prescreened credit card offers to a borrower comprises a prescreen module configured to receive an indication of one or more prescreened credit card offers for a borrower, wherein the borrower has at least about a 90% likelihood of being granted a credit card associated with each of the prescreened credit card offers after completing a corresponding full credit card application, a ranking module configured to assign a unique rank to at least some of the prescreened credit card offers, wherein determination of respective ranks for the prescreened credit card offers is based on at least a bounty and a click-thru-rate associated with respective prescreened credit card offers, and a presentation module configured to generate a data structure comprising information regarding at least a highest ranked credit card offer.

In one embodiment, a method of determining prescreened credit card offers comprises receiving information regarding a borrower from a referring website, determining two or more prescreened credit card offers associated with the borrower, determining ranking criteria associated with the referring website, the ranking criteria comprising an indication of attributes associated with one or more of the borrower and respective prescreened credit card offers, calculating an expected value of the two or more prescreened credit card offers based at least on the attributes indicated in the ranking criteria, and transmitting a data file to the referring website, the data file comprising an identifier of one of the prescreened credit card offers having an expected value higher than the expected values of the other prescreened credit card offers.

In one embodiment, a method of ranking a plurality of credit card offers that have been prescreened for presentation to a potential borrower comprises receiving information regarding each of a plurality of credit card offers, determining an expected value of each of the prescreened credit card offers, wherein the expected value for a particular credit card offer is based on at least (1) a money amount payable to a referrer if the potential borrower is issued a particular credit card associated with the particular credit card offer; (2) an expected ratio of potential borrowers that will apply for the particular credit card offer in response to being presented with the particular credit card offer, and (3) an expected ratio of potential borrowers that will be issued the particular credit card associated with the particular credit card offer, and ranking the plurality of credit card offers based on the expected values for the respective credit card offers.

In one embodiment, a method of determining an expected value for each of a plurality of credit card offers comprises receiving an indication of a plurality of prescreened credit card offers associated with an individual, receiving an indication of a plurality of attributes associated with each of the prescreened credit card offers, and calculating an expected value for each of the prescreened credit card offers using at least two of the plurality of attributes for each respective prescreened credit card offer.

BRIEF DESCRIPTION OF THE DRAWINGS

FIG. 7 is one embodiment of a user interface that may be presented to a visitor of a third party website, such as a website that offers goods and/or services to visitors, providing the visitor with an opportunity to apply for a highest ranked prescreened credit card offer.

FIG. 8 is one embodiment of a user interface for presenting multiple ranked, prescreened credit card offers to a borrower, along with respective links associated with the offers that may be selected in order to apply for one or more of the prescreened credit cards.

DETAILED DESCRIPTION OF CERTAIN EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions described herein.

The systems and methods described herein perform a prescreening process on a potential borrower to determine which available credit cards the borrower will likely be issued after completing a full application with the issuer. The term "potential borrower," or simply "borrower," includes one or more of a single individual, a group of people, such as a couple or a family, or a business. The term "prescreened credit card offers," "prescreened offers," or "matching offers," refers to zero or more credit card offers for which a potential borrower will likely be approved by the issuer, where the prescreening process may be based on credit data associated with the borrower, as well as approval rules for a particular credit card and/or credit card issuer, and any other related characteristics. In one embodiment, a particular credit card offer is included in prescreened credit card offers for a particular borrower if the likelihood that the borrower will be granted the particular credit card offer, after completion of a full application, is greater than a predetermined threshold, such as 60%, 70%, 80%, 90%, or 95%, for example.

In one embodiment, the prescreened offers are ranked, such as by assigning a 1-N ranking to each of N prescreened offers for a particular borrower, where N is the total number of prescreened offers for a particular borrower. In one embodiment, the rankings are generally based upon a bounty paid to the referrer. In another embodiment, the rankings are based on an expected value of each prescreened offer, which generally represents an expected monetary value to one or more referrers involved in providing the prescreened offer to the borrower. In one embodiment, the expected value of a credit card offer is based on a bounty associated with the offer, a click-through-rate for the offer, and/or a conversion rate for the offer. In another embodiment, the expected value for a credit card offer may be based on fewer or more attributes. Exemplary systems and methods for determining expected values and corresponding rankings for prescreened credit card offers are described below.

Figure 1:
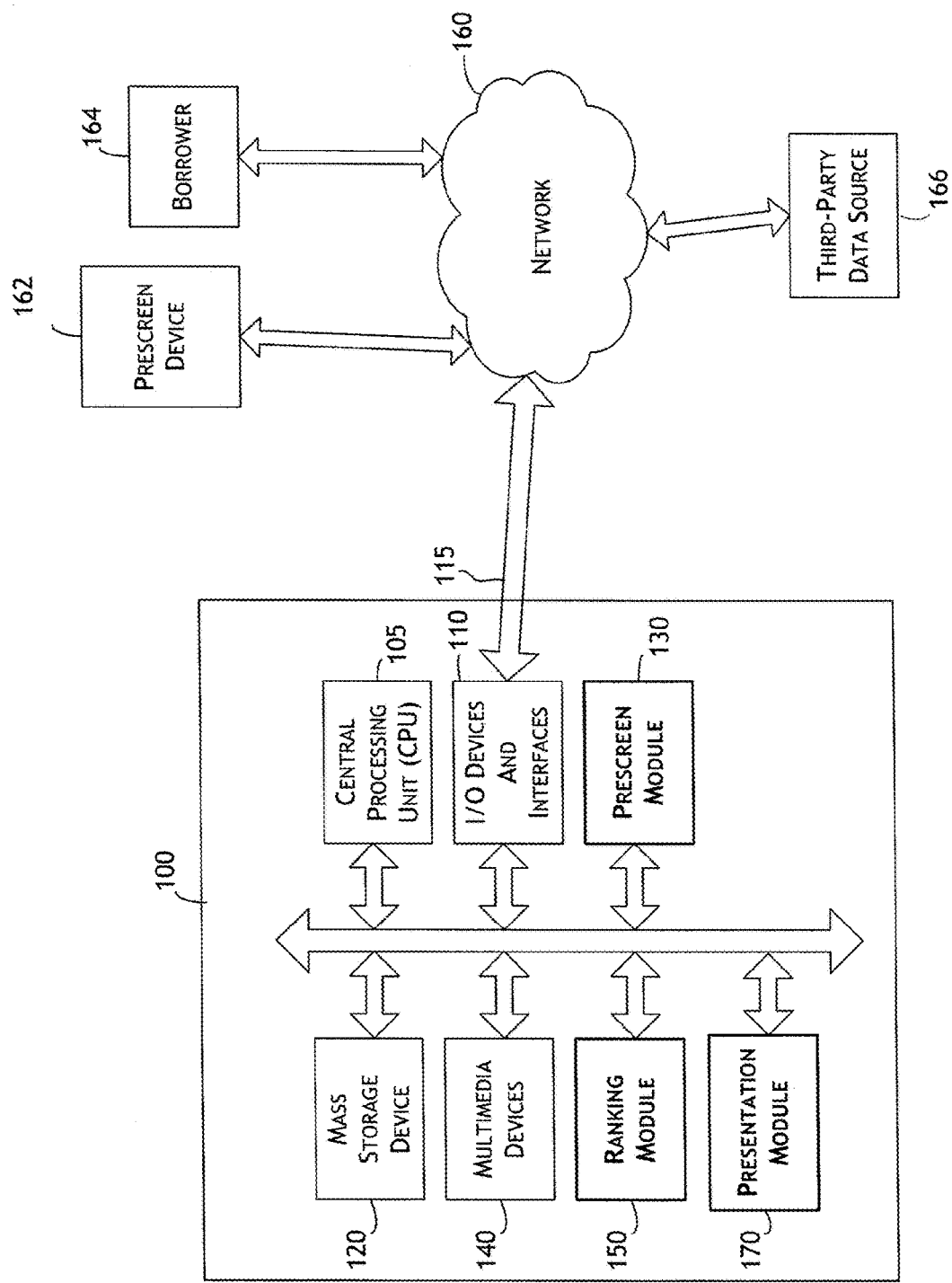
FIG. 1 is a block diagram of one embodiment of a computing device configured to rank prescreened credit card offers.

FIG. 1 is block diagram of a prescreened credit card offer ranking device 100, or simply a "ranking device 100," configured to rank prescreened credit card offers. The exemplary ranking device 100 is in communication with a network 160 and various devices and data sources are also in communication with the network 160. In the embodiment of FIG. 1, a prescreen device 162 and a borrower device 164, such as a computing device executing a web browser, and a third party data source 166 are each in communication with the network 160. The ranking device 100 may be used to implement certain systems and methods described herein. For example, in one embodiment the ranking device 100 may be configured to prescreen potential borrowers in order to receive a list of prescreened credit card offers and rank the prescreened offers for presentation to the borrower. In certain embodiments, the ranking device 100 also performs portions of the prescreening process that results in a list of unranked prescreened offers, prior to ranking the prescreened offers. In other embodiments, the ranking device 100 receives prescreened offers from a networked device. The functionality provided for in the components and modules of the ranking device 100 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the ranking device 100 includes, for example, a server or a personal computer that is IBM, Macintosh, or Linux/Unix compatible. In another embodiment, the ranking device 100 comprises a laptop computer, cellphone, personal digital assistant, kiosk, or audio player, for example. In one embodiment, the exemplary ranking device 100 includes a central processing unit ("CPU") 105, which may include a conventional microprocessor. The ranking device 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the ranking device 100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The ranking device 100 is generally controlled and coordinated by operating system software, such as the Windows 95, 98, NT, 2000, XP, Linux, SunOS, Solaris, PalmOS, Blackberry OS, or other compatible operating systems. In Macintosh systems, the operating system may be any available operating system, such as MAC OS X. In other embodiments, the ranking device 100 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary ranking device 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The ranking device 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the ranking device 100 is in communication with a network 160, such as any combination of one or more LANs, WANs, or the Internet, for example, via a wired, wireless, or combination of wired and wireless, via the communication link 115. The network 160 communicates with various computing devices and/or other electronic devices via wired or wireless communication links. In the exemplary embodiment of FIG. 1, the network 160 is in communication with the prescreen device 162, which may comprise a computing device and/or a prescreen data store operated by a credit bureau, bank, or other entity. For example, in one embodiment the prescreen device 162 comprises a prescreen data store comprising credit related data for a plurality of individuals. In one embodiment, the prescreen device 162 also comprises a computing device that determines one or more prescreened offers for borrowers and provides the prescreened offers directly to the borrower or to the ranking device 100, for example.

The borrower 164, also in communication with the network, may send information to the ranking device 100 via the network 160 via a website that interfaces with the ranking device 100. Depending on the embodiment, information regarding a borrower may be provided to the ranking device 100 from a website that is controlled by the operator of the ranking device 100 (referred to generally as the "ranking provider") or from a third party website, such as a commercial website that sells goods and/or services to visitors. The third party data source 166 may comprise any number of data sources, including web sites and customer databases of third party websites, storing information regarding potential borrowers. As described in further detail below, the ranking device 100 receives information regarding a potential borrower directly from the borrower 164 via a website controlled by the ranking provider, from the third party data source 166, and/or from the prescreen device 162. Depending on the embodiment, the ranking device 100 either initiates a prescreen process, performs a prescreen process, or simply receives prescreened offers for a borrower from the prescreen device 162, for example, prior to ranking the prescreened offers.

In the embodiment of FIG. 1, the ranking device 100 also includes three application modules that may be executed by the CPU 105. More particularly, the application modules include a prescreen module 130, a ranking module 150, and a presentation module 170, which are discussed in further detail below. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Figure 2:
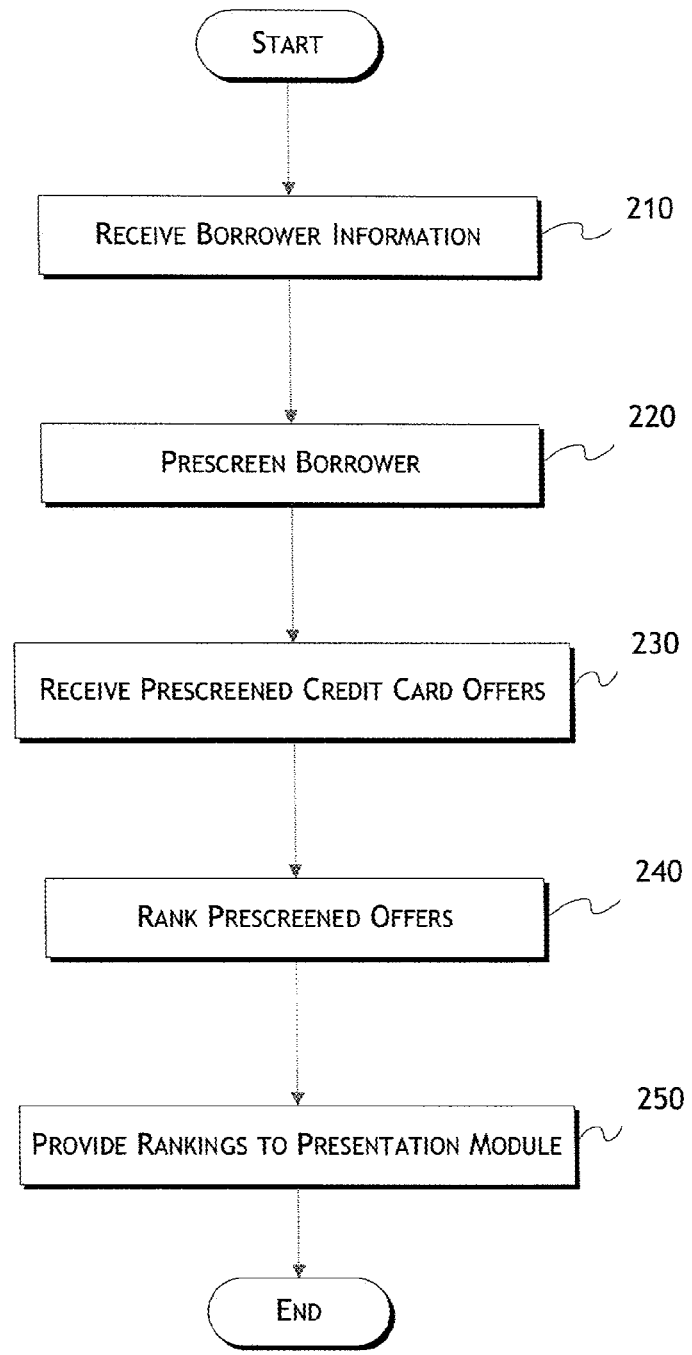
FIG. 2 is a flowchart illustrating one embodiment of a process that may be performed by the computing device of FIG. 1 in order to receive prescreened offers and rank those prescreened offers.

FIG. 2 is a flowchart illustrating an exemplary process that may be performed by the ranking device 100 (FIG. 1) or other suitable computing device in order to rank prescreened offers for borrowers. Depending on the embodiment, certain of the blocks described below may be removed, others may be added, and the sequence of the blocks may be altered. For example, in one embodiment the process may begin with block 230 where the ranking device 100 receives prescreened offers for a borrower from a prescreen device 162 without being previously involved in the prescreening process.

Beginning in block 210, the prescreen module 130 (FIG. 1) of the ranking device 100 receives, or otherwise accesses, information regarding a potential borrower. For example, the prescreen module 130 may receive information, such as a name and address of the borrower 164, that has been entered into a website that is dedicated to matching consumers to prescreened credit card offers. In one embodiment, the borrower 164 operates a computing device comprising a browser that is configured to render a web interface provided by the ranking entity or an affiliate of the ranking entity, such as an entity that performs the prescreening of borrowers. In this embodiment, the borrower may enter data into the user interface specifically for the purpose of being presented with one or more prescreened offers. In another embodiment, the borrower information may be received from another borrower data source 162, such as a commercial website that wants to provide customers with one or more prescreened credit card offers. For example, a third party website that sells products and/or services to customers may send borrower data to the ranking device 100 in order to receive prescreened offers that may be presented to their customers. As noted above, in one embodiment the referrer of a borrower to apply for a credit card may receive a bounty upon issuance of an applied—for credit card to the customer. Thus, if the borrower information is received from the borrower device 164 via a website operated by the ranking entity, the bounty may be paid to the ranking entity. Likewise, if borrower information is provided by a third part, such as from the third party data source 166, a portion or all of the bounty may be paid to the third party. In other embodiments, the bounty could be shared between one or more third parties, the ranking entity, the prescreen entity, and/or others involved in the prescreening and ranking processes. In some embodiments, certain or all of the prescreened offers are not associated with a bounty.

Moving to block 220, the prescreen module 130 (FIG. 1) then performs the prescreen process, requests that a third party, such as the prescreen device 162, performs the prescreen process, or simply receives prescreened credit card offers from the prescreen device 162, for example. In one embodiment, the prescreen process accesses credit related data regarding the borrower and/or lender criteria associated with each of a plurality of credit card offers in order to determine one or more credit card offers that the borrower would likely be eligible for. Co-pending U.S. patent application Ser. No. 11/537,330, titled "Online Credit Card Prescreen Systems And Methods," filed on Sep. 29, 2006, which is hereby incorporated by references in its entirety, describes various methods of determining prescreened credit card offers for a potential borrower.

Continuing to block 230, the prescreened offers are received by the prescreen module 130, such as from the prescreen device 162. Alternatively, in an embodiment where the prescreen module 130 performs the prescreen process, in block 230 the prescreen module 130 completes the prescreen process and makes the prescreened offers available to other modules of the ranking device 100.

Moving to block 240, information regarding the prescreened offers is accessed by the ranking module 150. As described in further detail below with reference to FIG. 3, for example, the ranking module 150 ranks the prescreened offers according to one or more attributes. The attributes may be borrower attributes, attributes associated with particular prescreened offers, credit card issuer attributes, and/or other relevant attributes. In one embodiment, the attributes used by the ranking module 150, and the relative weightings assigned to each of the used attributes, are determined by the ranking entity and/or by a third party referrer that presents the ranked prescreened offers to the borrower.

Next, in block 250, the ranked prescreened offers are accessed by the presentation module 170 (FIG. 1), which is configured to make the prescreened offers available to the borrower, such as via a website operated by the prescreen provider, the ranking provider, and/or a third party. In one embodiment, for example, the presentation module 170 generates a presentation interface, such as one or more HTML pages, for example, that includes indications of one or more of the ranked credit card offers. Depending on the embodiment, the presentation interface may be rendered in a web browser, a portable document file viewer, or any other suitable file viewer. In one embodiment, the presentation interface comprises an embedded viewer so that the prescreened offers may be viewed without the need for a host viewing application on the borrower's computing device. Additionally, the presentation interface may comprise software code configured for rendering in a portable device browser, such as a cell phone or PDA browser, or other application on a portable device.

In one embodiment, the presentation interface comprises information regarding only the highest ranked prescreened offer. In other embodiments, the presentation interface comprises information regarding multiple, or all, of the prescreened offers and an indication of the respective offer rankings. Depending on the embodiment, the presentation interface may comprise software code that depicts one or more of the ranked credit card offers on individual pages in sequence, in a vertical list on a single page, and/or in a flipbook type flash-based viewer, for example. In other embodiments, the presentation interface comprises any other suitable software code for displaying the ranked credit card offers to the borrower or raw data that is usable for generating a user interface for presentation to the borrower. FIG. 2 illustrates only one embodiment of a method that may be used to rank prescreened offers.

Figure 3:
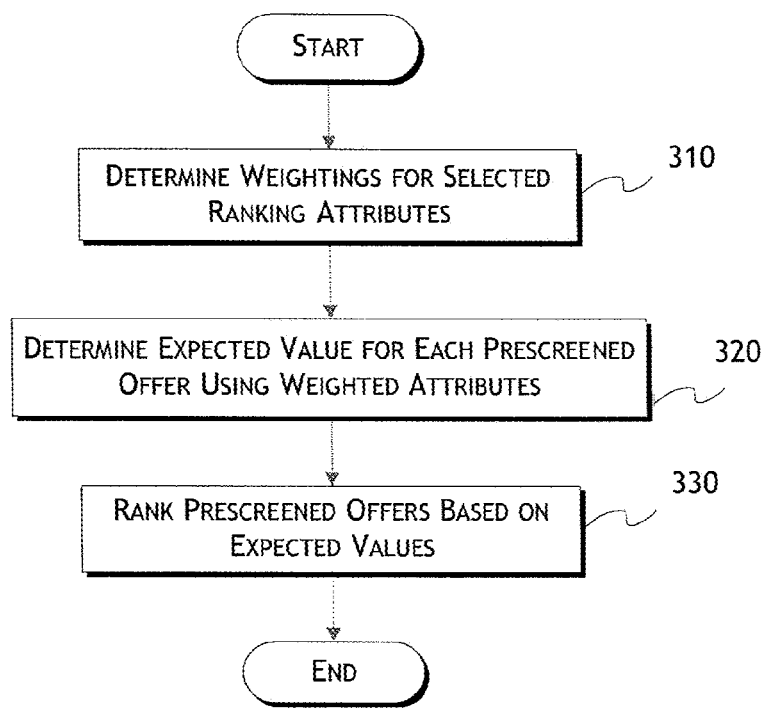
FIG. 3 is a flowchart illustrating one embodiment of a process of ranking prescreened offers.

FIG. 3 is a flowchart illustrating one embodiment of a process of ranking prescreened offers, such as may be performed in block 240 of FIG. 2. In an advantageous embodiment, multiple credit card offers that are returned from (or received by) the prescreen module 130, possibly from multiple credit card issuers, are presented to the borrower. In this embodiment, the ranking module 150 may rank the prescreened offers according to one or more attributes of the particular prescreened offers, credit card issuer criteria, and/or borrower characteristics, for example.

Beginning in block 310, the ranking module 150 determines the attributes to be considered in the ranking process. Additionally, the ranking module 150 may determine weightings that should be assigned to attributes, if any. In one embodiment, attribute weightings are determined based on ranking criteria from the referring entity, such as a third party transmitting borrower data from the third party data source 166, ranking criteria from the prescreen device 162, and/or ranking criteria established by the ranking entity. For example, a first third party website may be associated with a first set of ranking criteria, where the ranking criteria indicate attributes, and possibly weightings for certain of the attributes, that should be applied to prescreened offers in determining prescreened offer rankings for visitors of the first third party website. Likewise, a second third party website may have a partially or completely different set of ranking criteria (where the ranking criteria comprises one or more attributes, and possibly different weightings for certain attributes), that should be applied to prescreened offers in determining prescreened offers for visitors of the second third party website. In one embodiment, if no ranking criteria are provided by the entity requesting the prescreened offer rankings, no ranking of the prescreened offers is performed or, alternatively, a default set of ranking criteria may be used to rank the prescreened offers.

For example, borrower data received from a third party data source 162 may indicate that bounty is the only attribute to be considered in ranking prescreened offers. Thus, if three prescreened offers are returned from the prescreen module 130 for a particular borrower, and each offer has a different bounty, the offer with the largest bounty will be ranked highest and, thus, displayed to the borrower first.

Other attributes that may be considered in the prescreen process may include, for example, historical click-through-rate for an offer, historical conversion rate for an offer, geographic location of the borrower, special interests of the borrower, modeled overall click propensity for the borrower, the time of day and/or day of week that the prescreening is requested, and promised or desired display rates for an offer. Each of these terms is defined below:

"Click-through-rate" or "CTR" means the ratio of an expected number of times a particular credit card offer will be pursued by borrowers to a number of times the credit card offer will be displayed to borrowers. Thus, if a credit card offer is expected to be pursued by borrowers 30 times out of each 60 times the offer is presented, the CTR for that offer is 50%. The CTR may be determined from historical rates of selection for presented credit card offers.

"Conversion Rate" or "CR" means the expected percentage of borrowers that will be accepted for a particular credit card upon application for the credit card. In one embodiment, each credit card offer has an associated conversion rate. The CR may be determined from historical rates of borrowers that are accepted for respective credit card offers.

"Geographic location of the borrower" may comprise one or multiple levels of geographic identifiers associated with a borrower. For example, the geographic location of the borrower may indicate the residential location of the borrower and/or a business location of the borrower. The geographic location of the borrower may further indicate a portion of a municipality, a municipality, a county, a region, a state, or a country in which the borrower resides.

"Click Propensity" means the particular borrower's propensity to select links that are presented to the borrower. In one embodiment, click propensity may be limited to certain types of links, such as finance related links. In one embodiment, click propensity may be determined based on historical information regarding the borrower's browsing habits and/or demographic analysis of the borrower. In one embodiment, each borrower is associated with a unique click propensity, while in other embodiments groups of borrowers, such as borrowers in a common geographic region or using a particular ISP, may have a common click propensity.

"Time of day and/or day of week that the prescreening is requested" means the time of day and/or day of week that a prescreening request is received by a prescreen provider, a ranking provider, or by a third party website.

"Promised or desired display rates for the offer" may include periodic display quotas for a particular credit card offer, such as may be agreed upon by a prescreen provider and the credit card issuer, for example.

"Special interests" of the borrower include any indications of propensities and/or interests of the borrower. Special interests may be determined from information received from the borrower, from a third party through which the prescreened offers are being presented to the borrower, and/or from a third party data source. A third party data source may comprise a data source that may charge a fee for providing data regarding borrowers, such as interests, purchase habits, and/or life-stages of the borrower, for example. The special interest data may indicate, for example, whether the borrower is interested in outdoor activities, travel, investing, automobiles, gardening, collecting, sports, shopping, mail-order shopping, and/or any number of additional items. In one embodiment, special interests of the borrower are provided by Experian's Insource data source.

In one embodiment, the ranking process may also comprise determining an expected value of certain prescreened offers using one or more of the above attributes and then performing a long term projection that considers offer display limits and schedules imposed by issuers, for example, as well as expected traffic patterns, in order to rank the credit card offers.

Thus, prescreened offers may be ranked using ranking criteria comprising any combination of the above-listed characteristics, and with various weightings assigned to the attributes. For example, in one embodiment the ranking module 150 may use ranking criteria that ranks prescreened offers based on each of the above-cited attributes that are weighted in the order listed above, such that the bounty is the most important (highly weighted) attribute, click-through-rate is the second most important attribute, and the promised or desired display rates for the offer is the least important (lowest weighted) attribute. In other embodiments, any combination of one or more of the above discussed attributes may be included in ranking criteria.

Moving to block 320, an expected value to the referrer of showing each prescreened offer to the borrower is determined based upon the determined weighted attributes. Finally, in block 330, the prescreened offers assigned ranks based on their respective expected values. In one embodiment, block 330 is bypassed and the expected values for credit card offers represent the ranking.

Described below are exemplary methods of ranking prescreened offers, such as may be performed in blocks 320, 330 of FIG. 3. The examples below are provided as examples of how ranking may be performed and are not intended to limit the scope of the systems and methods described herein. Accordingly, it will be appreciated that other methods of ranking prescreened offers using the above-listed attributes, in addition to any other available attributes, in various other combinations and with different weightings than discussed herein, are expressly contemplated In one embodiment, rankings may be based on bounty alone. For example, the table below illustrates four prescreened offers that are ranked according to bounty.

TABLE 1

| Offer Number | Bounty ($) | Rank |
|---|---|---|
| 1 | 0.40 | 3 |
| 2 | 0.30 | 4 |
| 3 | 1.20 | 1 |
| 4 | 0.75 | 2 |

Thus, if the ranking is based only on bounty, the referrer would likely display Offer 3 first, as it has the highest bounty, Offer 4 next, followed by Offer 1, and then Offer 2. In another embodiment, the referrer may display only a single credit card offer to the borrower or a subset of the offers to the borrower. In this embodiment, the borrower would likely display the highest ranked offer.

In another embodiment, the ranking criteria may include one or more of a combination of bounty, click-though-rate, and conversion rate for each prescreened offer. Considering the same four offers listed in Table 1, when the click-through-rate and conversion rate are also considered, the rankings could change significantly. In one embodiment, the bounty is simply multiplied by the click-through-rate and conversion rate in order to determine an expected value for each offer, where the highest expected value would be ranked highest. The table below illustrates the four exemplary prescreened offers illustrated in Table 1, but with rankings that are based on the click-through-rate and conversion rate, as well as the bounty, for each offer.

TABLE 2

| Offer Number | Bounty | Click-through-rate (percent) | Conversion rate (percent) | Expected Value (Bounty * CTR * CR) | Rank [Rank in Table 1] |
|---|---|---|---|---|---|
| 1 | 0.40 | 4 | 0.3 | 0.48 | 4[3] |
| 2 | 0.30 | 2.5 | 1.1 | 0.82 | 2[4] |
| 3 | 1.20 | 1 | 0.6 | 0.72 | 3[1] |
| 4 | 0.75 | 3 | 1.4 | 3.15 | 1[2] |

The last column of the above table illustrates both the ranking for each offer based on a calculated expected value, and also indicates the ranking for each prescreened offer based only on bounty [in brackets]. As shown, each of the offer rankings has changed. For example, the second highest ranked prescreened offer based only on bounty is the highest ranked prescreened offer based on the expected value, while the highest ranked prescreened offer based only on bounty is now the third highest ranked prescreened offer.

In another embodiment, the attributes used in determining an expected value of prescreened offers may be weighted differently, such that certain heavily weighted factors may have more affect on the expected value than other lower weighted attributes. For example, with regard to Table 2, if the bounty and the conversion rate are the most important factors, while the click-through-rate is not as important in determining an expected value, the bounty and conversion rates may each be weighted higher by multiplying their values by 2, 3, 4, 5 or some other multiplier, while not multiplying the click-through-rate by a multiplier, or multiplying the click-through-rate by a fractional multiplier, such as 0.9, 0.8, 0.7, 0.5, or lower. Table 3 below illustrates the four exemplary prescreened offers illustrated above, but with an exemplary weighting of 2 assigned to the bounty and conversion rate and no weighting assigned to the click-through rate.

TABLE 3

| Offer Number | Bounty ($) | Weighted Bounty (*2) | Click-through-rate (percent) | Conversion rate (percent) | Weighted Conversion rate (*2) | Expected Value (weighted Bounty * CTR * weighted CR) | Weighted Rank [Rank in Table 1, Table 2] |
|---|---|---|---|---|---|---|---|
| 1 | 0.40 | 0.80 | 4 | 0.3 | 0.6 | 1.92 | 4 [4, 3] |
| 2 | 0.30 | 0.60 | 2.5 | 1.1 | 2.2 | 3.3 | 3 [2, 4] |
| 3 | 1.20 | 2.40 | 1 | 0.6 | 1.2 | 2.88 | 2 [3, 1] |
| 4 | 0.75 | 1.50 | 3 | 1.4 | 2.8 | 12.6 | 1 [1, 2] |

In the example of Table 3, the ranking for offers 2 and 3 have alternated when the exemplary weightings for the bounty and the conversion rate were added.

In one embodiment, special interests of the borrower are used in calculating an expected value for certain or all prescreened offers. For example, an expected value formula may include a special interest value, where certain credit cards are associated with various special interests that increase the special interest value for borrowers that are determined to have corresponding special interests. For example, a first credit card may be sports related, while a second credit card may have a rewards program offering movie tickets to cardholders. Thus, for a borrower with special interests in one or more sports, the special interest value for the first card may be increased, such as to 2 or 3, while the special interest value for the same borrower may be 1 or less for the second card. In one embodiment, the special interest values vary based on the borrowers strength in a particular interest segment. For example, a strong NASCAR fan might have a special interest value of 3 for a NASCAR-related credit card, while a weak traveler might only have a special interest value of 1.1 for a travel-related credit card. In other embodiments, the special interest values may be lower or higher than the exemplary values described above. The special interests of the borrower may be used in other manners in ranking prescreened offers.

In one embodiment, expected values for prescreened offers include a factor indicating expected future rankings for a respective card. Alternatively, a calculated expected value for a card may be adjusted based on a determined expected future ranking for the card. For example, the expected future ranking of one or more credit card offers X hours (where X is any number, such as 0.25, 0.5, 1, 2, 4, 8, 12, or 24, for example) after determining the initial rankings may impact the initial rankings. Thus, rankings for each of a plurality of prescreened offers may first be generated and then modified based on expected future rankings for respective offers. For example, prescreened offer rankings for a first user determined at a first time, e.g., in the morning, may include multiple prescreened offers ranked according to the prescreened offers respective expected values in the order: offer A, E, and D. In this embodiment, the expected value for offer A may be only slightly larger than offer E (or may be significantly larger than offer E). In one embodiment, after determining the ranking order for the first user, the ranking module 150 analyzes a historical traffic pattern for one or more of offers A, E, and D, and determines that typically later in the day (e.g., 4-8 hours after the initial prescreening is performed) a large quantity of borrowers apply for the card associated with offer A, while very few apply for the card associated with offer E. Thus, in certain embodiments offer E may be promoted to the first choice for the first user because offer E is even less likely to be applied—for later in the day. In one embodiment, an expected value formula for a group of prescreened offers may include an expected future ranking value, where the expected future ranking value for the prescreened offers may be determined using precalculated trending data or using realtime updated trending data. In some embodiments, the expected values for credit card offers may be affected by offer presentation limits or quotas associated with certain prescreened offers.

Figure 4:
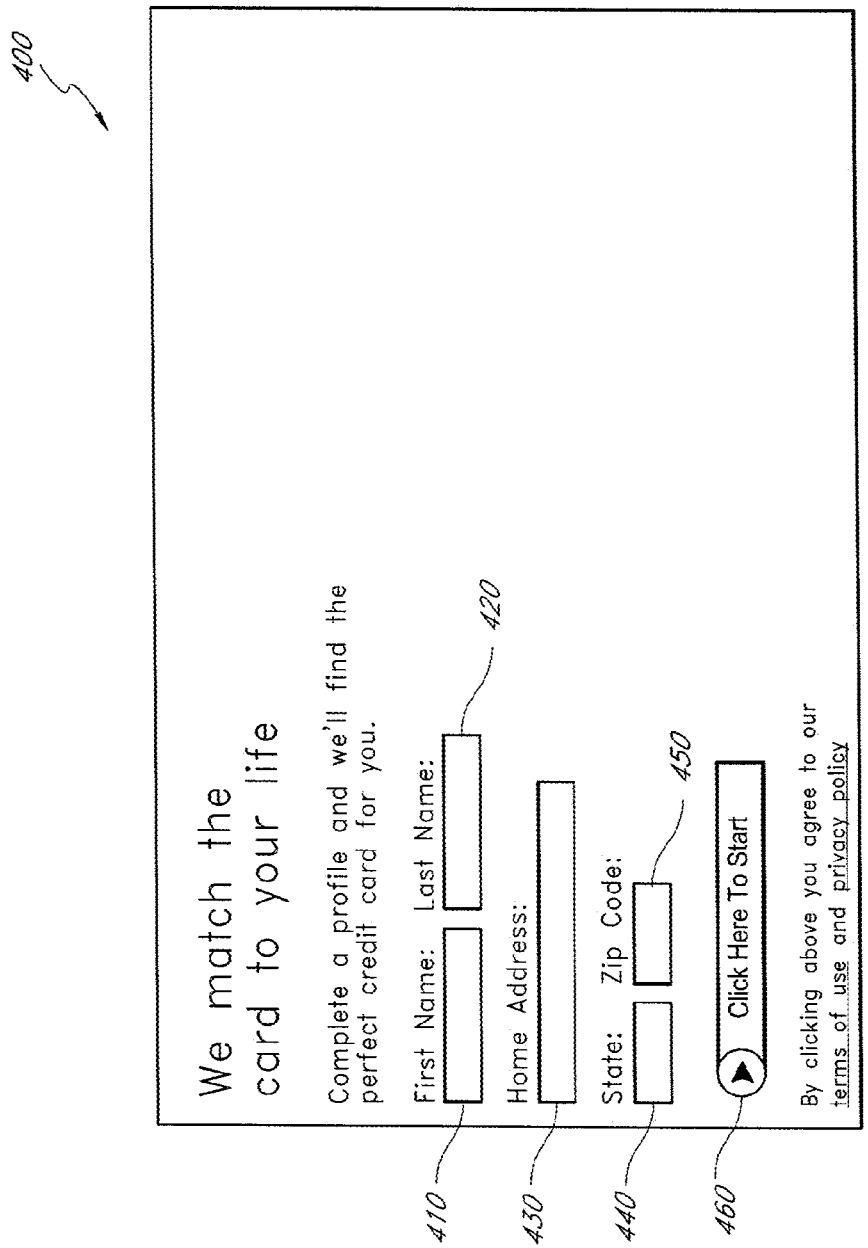
FIG. 4 is one embodiment of a user interface that allows a potential borrower to enter information for submission to a prescreen provider.

FIG. 4 is one embodiment of a user interface 400 that allows a potential borrower to enter information for submission to a ranking provider and/or to a prescreen provider. In one embodiment, the user interface 400 is controlled by the prescreen provider such that data submitted in the user interface 400 is transmitted to the ranking device 100 (FIG. 1). In other embodiments, the user interface 400, or similar interface, may be presented to a borrower by the prescreen provider or by a third party website. For example, the third party data source 166 may comprise software code, such as HTML, CSS, XML, JavaScript, etc., configured to render a user interface, such as the user interface 400, in the browser of the borrower 164.

In the embodiment of FIG. 4, the user interface 400 comprises a first name and last name field 410, 420, a home address field for 30, a state field 440, and a zip code field 450, each comprising text entry fields in the exemplary user interface 400. Depending on the embodiment, one or more of the fields 410, 420, 430, 440, 450 may be replaced by other data controls, such as drop-down lists, radio buttons, or auto-fill text boxes, for example. In other embodiments, the user interface 400 comprises only a subset of the text entry fields illustrated in FIG. 4. For example, in one embodiment the user interface 400 may include only a last name field 420 and a ZIP code field 450. The user interface 400 further comprises a start button 460 that is selected in order to transmit entered data to the prescreen provider, the ranking provider, and and/or the hosting third party website. In one embodiment, when the borrower selects the start button 460, the borrower data is transmitted to the ranking device 100 and a prescreening and ranking procedure, such as the method of FIGS. 2 and/or 3, is performed using the borrower data.

Figure 5:
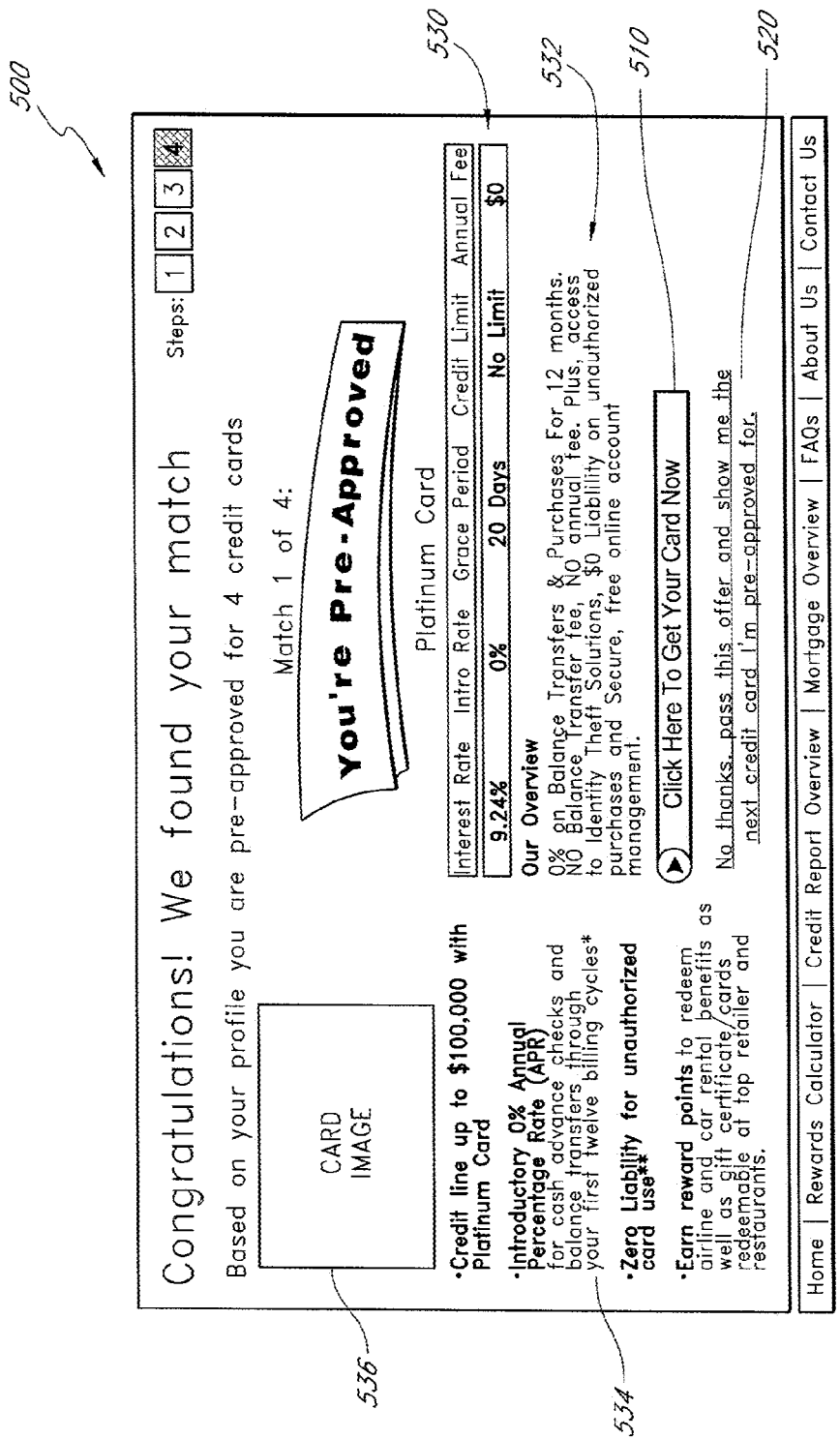
FIG. 5 is one embodiment of a user interface presenting a highest ranked prescreened credit card offer to a particular borrower.

FIG. 5 is one embodiment a user interface 500 presenting a credit card offer that a first borrower was matched to, along with a link 510 that may be selected in order to apply for the illustrated credit card. Exemplary user interface 500 also includes a link 520 that may be selected in order to display one or more additional credit cards to which the borrower has been matched. In the embodiment of FIG. 5, the user interface 500 comprises term information 530, overview information 532, summary information 534, and a card image 536 for the prescreened credit card offer. In one embodiment, the user interface 500 is presented to the borrower after the borrower completes the text entry fields of a user interface, such as user interface 400, and submits the borrower information, such as by clicking on the start button 460 of user interface 400. In other embodiments, a third party website may provide borrower information to the prescreen provider and, in response, the prescreen provider may transmit a ranked listing of prescreened credit card offers to the third party website, which may be presented to the borrower via a user interface such as user interface 500.

In the embodiment of FIG. 5, the user interface 500 indicates that the borrower has been prescreened for 4 credit cards, meaning that the prescreening process has indicated that there are 4 credit cards that the particular borrower would likely be granted after completion of a full application with the respective issuers. While the prescreen module 130 indicates that there are 4 prescreened credit card offers for the particular borrower, the user interface 500 displays information regarding only a single highest ranked prescreened credit card offer. In one embodiment, if the borrower does not care to apply for the displayed highest ranked prescreened offer, the borrower may select the link 520 and be presented with one or more of a second through fourth ranked prescreened offers. As noted above, the prescreened offers may be ranked according to various combinations of criteria associated with the borrower, such as the borrowers credit information, Web browsing characteristics, geographic location, as well as criteria established by the respective credit card issuers, among other attributes.

Figure 6:
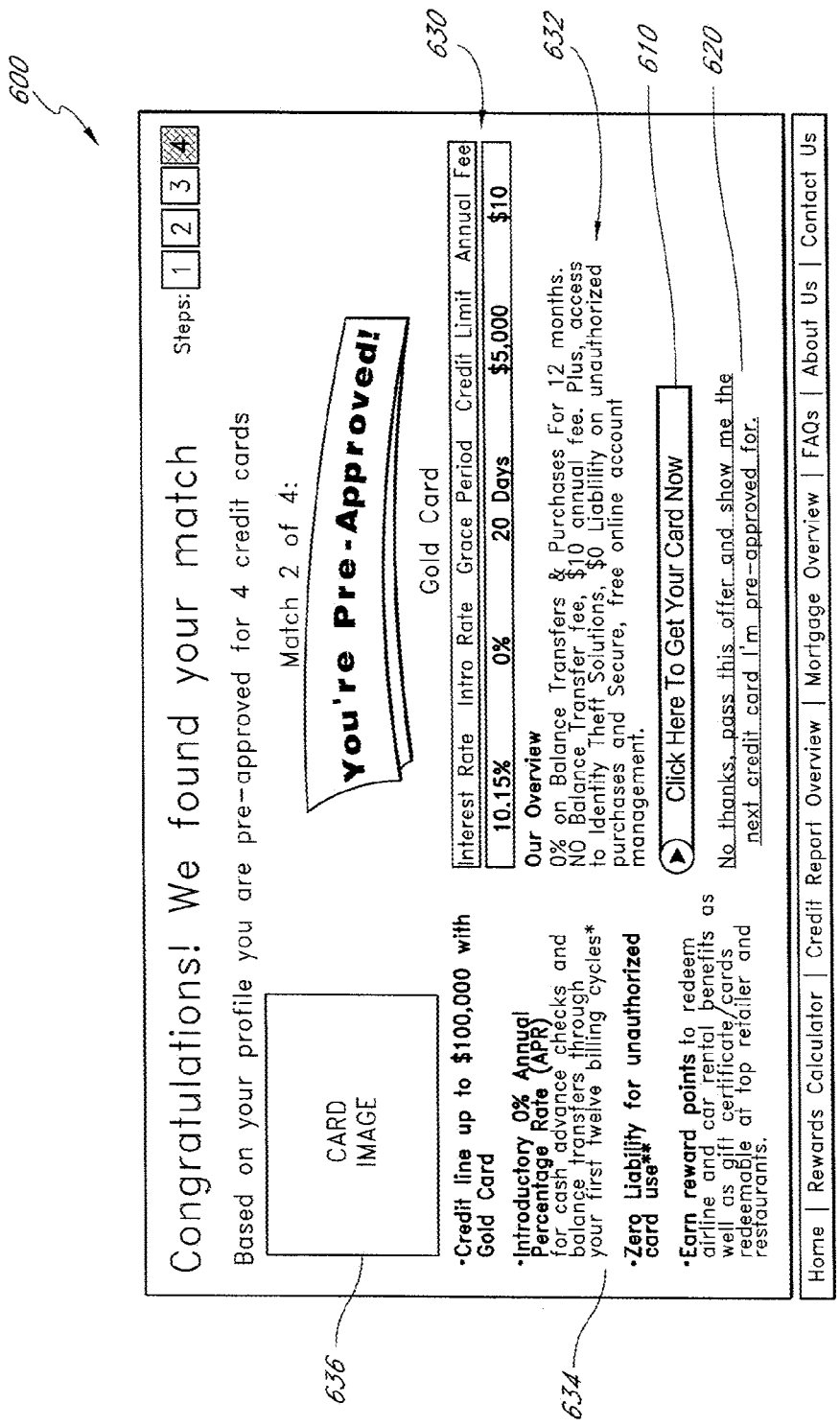
FIG. 6 is one embodiment of a user interface presenting a second highest ranked prescreened credit card offer to the particular borrower.

FIG. 6 is one embodiment of a user interface 600 presenting a second highest ranked credit card offer to the borrower in response to selecting the link 520 of FIG. 5, for example. As noted above with respect to FIG. 5, if the borrower is not interested in applying for the highest ranked credit card offer presented in the user interface 500, the borrower may select to view another prescreened credit card offer, such as is presented in the user interface 600. The user interface 600 comprises a link 610 that may be selected in order to apply for the illustrated (second highest ranked) credit card and a link 620 that may be selected in order to display one or more additional lower ranked (e.g., third highest ranked) prescreened credit card offers to which the borrower. Similar to the user interface 500, the user interface 600 also comprises term information 630, overview information 632, summary information 634, and a card image 636 for the illustrated prescreened credit card offer. Depending on the embodiment, the borrower is not aware of any special ordering of the credit card offers that are presented.

FIG. 7 is one embodiment of a user interface 700 that may be presented to a visitor of a third party website, such as a website that offers goods and/or services to visitors. For example, a user interface similar to that of FIG. 7 may be presented to a visitor of a shopping website after the visitor has selected one or more products for purchase and has selected a "checkout" or "complete transaction" link on the shopping website. The exemplary user-interface 700 comprises information 710 regarding a highest ranked prescreened credit card offer for the particular visitor, as determined by the ranking device 100, for example, via one or more network connections, such as the network 160. In one embodiment, the third party website requests visitor information that is used in locating prescreened credit card offers for the visitor prior to presenting the user interface 700. In one embodiment, the third party website comprises a customer database that contains visitor information that was received during a previous visit to the third party website by the visitor. Thus, in one embodiment the visitor is not requested to supply personal information, but instead the third party website locates the visitor information and provides the information to the ranking device 100.

In the embodiment of FIG. 7, the borrower can apply for the prescreened credit card by selecting the start button 720 of user interface 700. In one embodiment, when the start button 720 is selected by the borrower, a user interface from the credit card issuer, or an agent of the credit card issuer, is provided to the borrower in order to complete the credit card application process. In one embodiment, after completing the application process with the credit card issuer, the borrower is able to use the new credit card for purchase of the goods and/or services from the third party website.

In the embodiment of FIG. 7, the visitor to the third party website may choose to view additional prescreened offers by selecting the link 730, in response to which the visitor is provided with additional prescreened credit card offers in an order that is determined by the rankings for the respective offers. For example, the visitor may be presented with a user interface including data regarding a second highest ranked credit card offer.

FIG. 8 is one embodiment of a user interface 800 for presenting multiple credit card offers that a borrower was matched to, along with respective links associated with the offers that may be selected in order to apply for a credit card. In the embodiment of FIG. 8, a top three highest-ranked prescreened offers are simultaneously displayed to the borrower in the user interface 800. In one embodiment, the top three ranked prescreened offers are the three credit card offers with the highest calculated expected values. As discussed above, the expected values for respective credit card offers may be calculated based on various combinations of attributes and possibly weightings for respective attributes. In certain embodiments, the host of the interface 800, such as the ranking provider or a third party website, may select a combination of attributes to be used in calculating expected values for available prescreened credit card offers.

In one embodiment, the prescreened offer 810 is associated with a highest ranked prescreened offer, the offer 820 is associate with a second highest ranked prescreened offer, and the offer 830 is associated with a third-highest prescreened offer. In another embodiment, the highest-ranked prescreened offer is displayed as offer 820, such that the highest ranked offer is in a more central portion of the user interface 800. In this embodiment, the second-highest rank prescreen offer may be presented as offer 810, and the third-ranked prescreen offer may be presented as offer 830. The user interface 800 also comprises start buttons 812, 814, and 816 that may be selected in order to initiate application for respective of the prescreened offers 810, 820, 830 by the borrower.

The foregoing description details certain embodiments of the invention. It will be appreciated, however, that no matter how detailed the foregoing appears in text, the invention can be practiced in many ways. The use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
   one or more central processing units;
   one or more storage devices including a random access memory for temporary storage of information, a read only memory for permanent storage of information, and a mass storage device;
   a network interface configured to communicate with:
      a plurality of servers comprising a first server associated with a first website and a second server associated with a second website;
      a product server associated with one or more product databases; and
      a third-party server associated with one or more third-party database; and
   one or more hardware processors configured to execute computer-executable instructions in order to:
      provide a plurality of simultaneous user sessions;
      during a first user session of the plurality of simultaneous user sessions:
         generate, via the one or more hardware processors, software instructions for the first website that is configured to render for display in a web browser a user interface including a user interface element selectable by a first user of a first user computing device such that the first user can electronically request prescreened products, wherein receiving an indication of an electronic selection of the user interface element includes a first electronic request for web browser data indicating one or more prescreened products for the first user;
         access, via the one or more hardware processors, a plurality of products from one or more databases, wherein the plurality of products are temporarily stored on the one or more storage;
         determine, via the one or more hardware processors, that the first user is associated with the first electronic request for products;

access, via the one or more hardware processors, from one or more databases associated with the third-party server, a first data file comprising first user characteristics associated with the first user, wherein at least a portion of the first data file is temporarily stored on the one or more storage devices;

during the first user session, calculate, via the one or more hardware processors, for each product of the plurality of products, and based at least in part on an application of preapproval rules indicating criteria for preapproval of users for each product, attribute values including at least:
  (1) a bounty attribute value indicative of an amount owed to an entity controlling operations of the first website from which the first user is directed to apply for the product if the first user is provisioned the product,
  (2) a click-through-rate attribute value indicative of an expected percentage of users that will electronically request the product of a total number of times the product is presented to respective users,
  (3) a conversion rate attribute value indicative of an expected percentage of users that are likely to will be provisioned the product of a total number of times the product is presented, wherein the attribute values for each product of the plurality of products are temporarily stored on the one or more storage devices, and
  (4) a click propensity attribute value indicative of a user's propensity to select a specific type of presented link, wherein the first user characteristics include one or more of: historical browsing habits of the first user and a demographic analysis of the first user, wherein the specific type of presented link includes links related to a type of product included in the plurality of products;

receive, from the first website, first custom ranking criteria which includes weightings for one or more calculated attribute values for automatically determining a ranking order of products;

receive first default ranking criteria indicating one or more default attribute weightings for determining a ranking order of products, wherein the first custom ranking criteria are different than the default ranking criteria;

receive, from a second website, second custom ranking criteria which includes weightings for one or more calculated attribute values, wherein the second custom ranking criteria is different from the first custom ranking criteria;

receive, from the first website, a first electronic request for products;

during the first user session, automatically determine, via the one or more hardware processors, a geographic location of the first user based at least in part on information received from the first user computing device, wherein the geographic location comprises multi-level alphanumeric identifiers associated with the first user, wherein the multi-level alphanumeric identifiers correspond to two or more of: residential location of the first user, business location associated with the first user, at least a portion of a municipality of the first user, or a residency of the first user;

identify, via the one or more hardware processors, a plurality of prescreened products of the plurality of products for which the first user would have a likelihood greater than a threshold value of being approved for provisioning of one or more products, wherein the prescreened products are identified at least based on prescreen criteria for respective products, the geographic location of the first user, and the first user characteristics;

determine, via the one or more hardware processors, that the first website is associated with the first electronic request for products;

for each of the plurality of prescreened products, automatically apply, via the one or more hardware processors, the first custom ranking criteria associated with the first website or the first default ranking criteria to calculate weighted attribute values associated with the prescreened product to determine a corresponding plurality of weighted attribute values;

calculate, via the one or more hardware processors, expected offer values for each of the prescreened products based at least on the weighted attribute values of the plurality of weighted attribute values associated with each of the prescreened products, wherein the expected offer values for each of the prescreened products are temporarily stored on the one or more storage devices, determine, via the one or more hardware processors, a first ranking of the prescreened products based on the plurality of weighted attribute values for respective prescreened products, wherein the first ranking is determined at a first time;

access, via the one or more hardware processors, historic traffic data and trending data associated with the prescreened products, wherein the historic traffic data includes prior selections of the prescreened products included in the first ranking, wherein the trending data indicates current selections received from the plurality of simultaneous user sessions of the prescreened products included in the first ranking;

calculate, via the one or more hardware processors, expected future rankings for each of the prescreened products based on one or more of: the historic traffic data and the trending data, wherein the expected future rankings are associated with a second time later than the first time;

determine, via the one or more hardware processors, a second ranking of the prescreened products based on the expected future rankings;

determine, via the one or more hardware processors, based at least on the second ranking, a highest ranked prescreened product having a highest expected offer value;

generate and transmit, via the one or more hardware processors, to the first website, first web browser data including at least Hypertext Markup Language, that is configured to be rendered by the first user computing device to display an interactive user interface including electronic information associated with the second ranking, wherein the second ranking includes the highest ranked prescreened product, and wherein the first website is configured to:
  display, via the one or more hardware processors, in the interactive user interface, the highest ranked prescreened product in a location that indicates that the highest ranked prescreened product is the highest ranked; and receive, from the first user computing device, first user electronic request information and a selection of a link associated with the highest ranked prescreened product, wherein the first user electronic request information and the selection are temporarily stored on the one or more storage devices;

transmit, via the one or more hardware processors, to a product provisioning system associated with the selected first prescreened product, a third data file comprising the first user electronic request information and information indicative of the selected first prescreened product; and upon receiving the third data file, the product provisioning system is configured to automatically cause display of an electronic graphical user interface on the first user computing device associated with the selected highest ranked prescreened product.

2. The computing system of claim 1, the one or more hardware processors further configured to:

during a second user session of the plurality of simultaneous user sessions:

receive, from the second website, a second electronic request for products;

determine, via the one or more hardware processors, that a second user is associated with the second electronic request for products;

access, via the one or more hardware processors, from the one or more databases associated with the third-party server, second user characteristics associated with the second user;

determine, via the one or more hardware processors, a second group of products based at least in part on the second user characteristics, wherein the second group of products is a subset of the plurality of products;

determine, via the one or more hardware processors, that the second website is associated with the second request for products;

apply the second custom ranking criteria associated with the second website to the calculated attribute values associated with each of the products in the plurality of prescreened products to determine a corresponding second plurality of weighted attribute values for each of the prescreened products in the second group of products; and determine, via the one or more hardware processors, a second ranking of the second group of products based on the corresponding second plurality of weighted attribute values.

3. The computing system of claim 2, the one or more hardware processors further configured to:

during the second user session:

generate and transmit, via the one or more hardware processors, to the second website, second user interface data that is configured to be rendered by a second user computing device to display an interactive user interface including information associated with the second ranking, and wherein the second website is configured to:

receive, from the second user computing device, second user electronic request information and a second selection of a product in the plurality of prescreened products;

transmit, via the one or more hardware processors, to a second product provisioning system, the second user electronic request information and second selected product; and wherein upon receiving the second selected product, the second product provisioning system is configured to cause display of an electronic request for the product on the second user computing device associated with the second selected product.

4. The computing system of claim 1, wherein a time period between accessing the first data file and displaying the highest ranked prescreened product is between 1 and 10 seconds long.

* * * * *

UNITED STATES PATENT AND TRADEMARK OFFICE
CERTIFICATE OF CORRECTION

PATENT NO. : 11,887,175 B2
APPLICATION NO. : 17/812859
DATED : January 30, 2024
INVENTOR(S) : Rohan K. K. Chandran It is certified that error appears in the above-identified patent and that said Letters Patent is hereby corrected as shown below:

On the Title Page

Page 5, Column 2 (Item (56) Other Publications), Line 13, delete "fromhttp:" and insert -- from http: --.

Page 6, Column 1 (Item (56) Other Publications), Line 65, delete "Particpating" and insert -- Participating --.

In the Specification

Column 9, Line 46, delete "click-though-rate," and insert -- click-through-rate, --.

Column 11, Line 54, delete "realtime" and insert -- real time --.

In the Claims

Column 14, Line 64, Claim 1, delete "storage;" and insert -- storage devices; --.

Column 15, Line 25-26, Claim 1, after "that" delete "arc likely to".

Signed and Sealed this
Seventh Day of May, 2024

Katherine Kelly Vidal
*Director of the United States Patent and Trademark Office*